US007840340B2

(12) United States Patent
Graham et al.

(10) Patent No.: US 7,840,340 B2
(45) Date of Patent: Nov. 23, 2010

(54) SYSTEMS, METHODS, AND COMPUTER PROGRAM PRODUCTS FOR GENERATING REFERENCE GEOCODES FOR POINT ADDRESSES

(75) Inventors: Craig Graham, Hanover, PA (US);
Prabhakar Thyagarjan, Laurel, MD (US); Pamela Klouda, Manchester, MD (US); Rhesa Jenkins, Atlanta, GA (US); Jonathan Hock, Glen Arm, MD (US); Mike Shamel, Owings Mills, MD (US); David Snader, Eldersburg, MD (US); Mike Cutler, Hampstead, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 893 days.

(21) Appl. No.: 11/735,030

(22) Filed: Apr. 13, 2007

(65) Prior Publication Data
US 2008/0255758 A1   Oct. 16, 2008

(51) Int. Cl.
*G06F 19/00* (2006.01)
*G01C 21/00* (2006.01)
(52) U.S. Cl. ................. 701/200; 701/208; 701/213
(58) Field of Classification Search ............... None
See application file for complete search history.

(56) References Cited
U.S. PATENT DOCUMENTS

| | | | |
|---|---|---|---|
| 3,956,740 A | 5/1976 | Jones et al. | |
| 4,408,782 A | 10/1983 | Condon | |
| 4,832,204 A | 5/1989 | Handy et al. | |
| 4,850,009 A | 7/1989 | Zook et al. | |
| 5,014,206 A | 5/1991 | Scribner et al. | |
| 5,227,614 A | 7/1993 | Danielson et al. | |
| 5,292,004 A | 3/1994 | Cesarini | |

(Continued)

FOREIGN PATENT DOCUMENTS

DE    44 12 097 C1    6/1995

(Continued)

OTHER PUBLICATIONS

International Search Report and Written Opinion for PCT/US2005/000729 dated Jan. 10, 2006.

(Continued)

*Primary Examiner*—Michael J. Zanelli
(74) *Attorney, Agent, or Firm*—Alston + Bird LLP

(57) ABSTRACT

Systems and methods are provided for generating a reference location data set, such as a reference longitude and latitude point, for each of a plurality of point addresses. A reference location data set can be determined for a point address based on a history of prior geocode samples, such as GPS readings, that have been obtained using a portable computing device during a prior delivery to or pickup from the point address. A location data service collects such geocode samples and processes the samples to generate a reference location data set, such as a reference longitude and latitude and a zone of confidence around the reference longitude and latitude, for each unique point address. To determine whether an item is being delivered to a wrong address, current location data obtained during a delivery can be compared against the reference location data generated by the location data service for the delivery address.

54 Claims, 18 Drawing Sheets

U.S. PATENT DOCUMENTS

| | | |
|---|---|---|
| 5,313,051 A | 5/1994 | Brigida et al. |
| 5,325,303 A | 6/1994 | Walz et al. |
| 5,347,274 A | 9/1994 | Hassett et al. |
| 5,375,226 A | 12/1994 | Sano et al. |
| 5,444,444 A | 8/1995 | Ross et al. |
| 5,472,097 A | 12/1995 | Villachica |
| 5,496,992 A | 3/1996 | Madan et al. |
| 5,497,149 A | 3/1996 | Fast |
| 5,500,516 A | 3/1996 | Durbin |
| 5,506,580 A | 4/1996 | Whiting et al. |
| 5,528,758 A | 6/1996 | Yeh |
| 5,532,694 A | 7/1996 | Mayers et al. |
| 5,534,684 A | 7/1996 | Danielson |
| 5,593,267 A | 1/1997 | McDonald et al. |
| 5,635,693 A | 6/1997 | Benson et al. |
| 5,648,770 A | 7/1997 | Ross |
| 5,650,967 A | 7/1997 | Seibert |
| 5,682,379 A | 10/1997 | Mahany et al. |
| 5,736,725 A | 4/1998 | Danielson |
| 5,751,973 A | 5/1998 | Hassett et al. |
| 5,764,774 A | 6/1998 | Liu |
| 5,770,841 A | 6/1998 | Moed et al. |
| 5,778,377 A | 7/1998 | Marlin et al. |
| 5,780,778 A | 7/1998 | Schwartz et al. |
| 5,790,429 A | 8/1998 | Baker et al. |
| 5,797,134 A | 8/1998 | McMillan et al. |
| 5,805,416 A | 9/1998 | Friend et al. |
| 5,805,419 A | 9/1998 | Hundt et al. |
| 5,808,564 A | 9/1998 | Simms et al. |
| 5,822,739 A | 10/1998 | Kara |
| 5,834,749 A | 11/1998 | Durbin |
| 5,835,377 A | 11/1998 | Bush |
| 5,855,006 A | 12/1998 | Huemoeller et al. |
| 5,862,500 A | 1/1999 | Goodwin |
| 5,867,382 A | 2/1999 | McLaughlin |
| 5,869,819 A | 2/1999 | Knowles et al. |
| 5,884,238 A | 3/1999 | Noll et al. |
| 5,905,232 A | 5/1999 | Schwartz et al. |
| 5,919,239 A | 7/1999 | Fraker et al. |
| 5,948,040 A | 9/1999 | DeLorme et al. |
| 5,971,587 A | 10/1999 | Kato et al. |
| 5,992,753 A | 11/1999 | Xu |
| 5,993,098 A | 11/1999 | Osada |
| 5,995,118 A | 11/1999 | Masuda |
| 5,995,950 A | 11/1999 | Barns-Slavin et al. |
| 6,003,773 A | 12/1999 | Durbin et al. |
| 6,006,106 A | 12/1999 | Cook et al. |
| 6,018,715 A | 1/2000 | Lynch et al. |
| 6,034,379 A | 3/2000 | Bunte et al. |
| 6,061,398 A | 5/2000 | Satoh et al. |
| 6,064,970 A | 5/2000 | McMillan et al. |
| 6,071,643 A | 6/2000 | Chino et al. |
| 6,084,528 A | 7/2000 | Beach et al. |
| 6,124,806 A | 9/2000 | Cunningham et al. |
| 6,134,437 A | 10/2000 | Karabinis et al. |
| 6,148,262 A | 11/2000 | Fry |
| 6,173,209 B1 | 1/2001 | Laval et al. |
| 6,175,826 B1 | 1/2001 | Malandra, Jr. et al. |
| 6,182,053 B1 | 1/2001 | Rauber et al. |
| 6,189,702 B1 | 2/2001 | Bonnet |
| 6,208,980 B1 | 3/2001 | Kara |
| 6,211,781 B1 | 4/2001 | McDonald |
| 6,232,915 B1 | 5/2001 | Dean et al. |
| 6,241,099 B1 | 6/2001 | Hendrickson et al. |
| 6,246,672 B1 | 6/2001 | Lumelsky |
| 6,249,008 B1 | 6/2001 | Bunte et al. |
| 6,266,612 B1 * | 7/2001 | Dussell et al. .............. 701/207 |
| 6,285,916 B1 | 9/2001 | Kadaba et al. |
| 6,329,919 B1 | 12/2001 | Boies et al. |
| 6,332,098 B2 | 12/2001 | Ross et al. |
| 6,408,233 B1 | 6/2002 | Solomon et al. |
| 6,433,732 B1 | 8/2002 | Dutta et al. |
| 6,459,969 B1 | 10/2002 | Bates et al. |
| 6,493,550 B1 | 12/2002 | Raith |
| 6,496,775 B2 | 12/2002 | McDonald, Jr. et al. |
| 6,529,786 B1 | 3/2003 | Sim |
| 6,532,152 B1 | 3/2003 | White et al. |
| 6,571,197 B1 | 5/2003 | Frank et al. |
| 6,648,770 B1 | 11/2003 | Snyder |
| 6,731,940 B1 | 5/2004 | Nagendran |
| 6,745,027 B2 | 6/2004 | Twitchell |
| 6,749,122 B1 | 6/2004 | Koenck et al. |
| 6,756,918 B2 | 6/2004 | Fomukong |
| 6,801,850 B1 | 10/2004 | Wolfson |
| 6,816,784 B1 | 11/2004 | Khan et al. |
| 6,819,267 B1 | 11/2004 | Edmark et al. |
| 6,868,386 B1 | 3/2005 | Henderson et al. |
| 6,885,991 B2 | 4/2005 | Skonberg et al. |
| 6,889,194 B1 | 5/2005 | Kadaba |
| 6,895,329 B1 | 5/2005 | Wolfson |
| 6,934,634 B1 * | 8/2005 | Ge ............................... 702/2 |
| 6,990,409 B2 | 1/2006 | Khan et al. |
| 7,034,683 B2 | 4/2006 | Ghazarian |
| 7,039,496 B2 | 5/2006 | Perez et al. |
| 7,076,505 B2 | 7/2006 | Campbell |
| 7,118,034 B2 | 10/2006 | Baldassari et al. |
| 7,421,311 B2 | 9/2008 | Perez et al. |
| 2001/0005171 A1 | 6/2001 | Farringdon et al. |
| 2002/0006806 A1 | 1/2002 | Kinnunen et al. |
| 2002/0010604 A1 | 1/2002 | Block |
| 2002/0024448 A1 | 2/2002 | Olesen |
| 2002/0044084 A1 | 4/2002 | Itoh et al. |
| 2002/0065065 A1 | 5/2002 | Lunsford et al. |
| 2002/0077060 A1 | 6/2002 | Lehikoinen et al. |
| 2002/0082931 A1 | 6/2002 | Siegel et al. |
| 2002/0085515 A1 | 7/2002 | Jaynes et al. |
| 2002/0132632 A1 | 9/2002 | Brassil et al. |
| 2002/0133437 A1 | 9/2002 | Ansley |
| 2002/0137472 A1 | 9/2002 | Quinn et al. |
| 2002/0156661 A1 | 10/2002 | Jones et al. |
| 2003/0010822 A1 | 1/2003 | Davies et al. |
| 2003/0040946 A1 | 2/2003 | Sprenger et al. |
| 2003/0055689 A1 | 3/2003 | Block et al. |
| 2003/0055690 A1 | 3/2003 | Garback |
| 2003/0083060 A1 | 5/2003 | Menendez |
| 2003/0109266 A1 | 6/2003 | Rafiah et al. |
| 2003/0114206 A1 | 6/2003 | Timothy et al. |
| 2003/0120526 A1 | 6/2003 | Altman et al. |
| 2003/0144985 A1 | 7/2003 | Ebert |
| 2003/0163287 A1 | 8/2003 | Vock et al. |
| 2003/0224818 A1 | 12/2003 | Nagasaka et al. |
| 2004/0138817 A1 * | 7/2004 | Zoken et al. .................... 702/5 |
| 2004/0139049 A1 | 7/2004 | Hancock et al. |
| 2004/0249557 A1 | 12/2004 | Harrington et al. |
| 2005/0137933 A1 | 6/2005 | Holsen et al. |
| 2006/0164232 A1 | 7/2006 | Waterhouse et al. |

FOREIGN PATENT DOCUMENTS

| | | |
|---|---|---|
| DE | 196 18 535 A1 | 7/1997 |
| EP | 0635800 A1 | 1/1995 |
| EP | 1 216 901 A1 | 6/2002 |
| GB | 2 225 459 A | 5/1990 |
| GB | 2 358 427 A | 7/2001 |
| GB | 2 363 884 A | 1/2002 |
| JP | 03-143824 | 6/1991 |
| JP | 04068942 | 3/1992 |
| JP | H6-333117 | 12/1994 |
| JP | 7-068222 | 3/1995 |
| JP | 07-199861 | 8/1995 |
| JP | 9-147032 | 11/1995 |
| JP | 9-305669 | 11/1997 |
| JP | 10-255166 | 9/1998 |
| JP | 11-347892 | 12/1999 |

| JP | 2001-209468 | 8/2001 |
| JP | 2001-278414 | 10/2001 |
| WO | WO 96/31846 | 10/1996 |
| WO | WO 01/91438 A1 | 11/2001 |
| WO | WO 03/014752 A1 | 2/2003 |
| WO | WO 03/081560 A1 | 10/2003 |

OTHER PUBLICATIONS

International Search Report for PCT/US2005/000729 dated Oct. 26, 2005.
International Search Report for PCT/US2005/000789 dated Jan. 10, 2006.
International Search Report for PCT/US2005/000789 dated Oct. 26, 2005.
Murphy, Jean V., "Yard Management Systems Extend Automation Beyond the Dock Door", SupplyChainBrain.com, Mar. 2005, Global Logistic & Supply Chain Strategies.
International Search Report for PCT/US05/42711 dated Jan. 16, 2008.
International Search Report and Written Opinion for PCT/US2008/03798 mailed Nov. 28, 2008.
Office Action for U.S. Appl. No. 11/688,631 mailed Feb. 4, 2010.
Office Action from Canadian Application Serial No. 2,443,132 dated Apr. 15, 2010.

* cited by examiner

```
                    130 ─┐
                         ┌─────────────────────────────────────┐
                         │ Street #    Street Name   Type Dir Suf│
                         │ 1           DULANEY VALLEY RD        │
                         │ City                    ZipCode  Unit│
                         │ TIMONIUM                21093    0210│
                         │ Consignee         (!)   Room     Flr │
                         │                         ▮▮▮▮         │
                         │ Note:1 - Message              CDS N  │
                         │  Completed Stop = 0  Prerec Stop = 0 │
                         │ SplCnts      PreComm          / -    │
                         │ ▐Edit    Dup    Notes  PreRec Ovrride│
                         │                                      │
                         │              ⊕              │ 7:33 │ │
                         └──────────────┬───────────────────────┘
                                        └── 140

131 ─┐
                         ┌─────────────────────────────────────┐
                         │ Street #    Street Name   Type Dir Suf│
                         │ 1           DULANEY VALLEY RD        │
                         │ ─────────────────────────(!)   5     │
                         │  1 - M Col Amt   Ship # ID#   Remark │
                         │  1              134561 446    MCM ▮ │
                         │                                      │
                         │                                      │
                         │  Edit    Dup   Ship#<6 PreRec Ovrride│
                         │ ▐PkgInfo NonDel  Notes       Deliver │
                         │              ◉              │ 7:34 │ │
                         └──────────────┬───────────────────────┘
                                        └── 141

132 ─┐
                         ┌─────────────────────────────────────┐
                         │ Street #    Street Name   Type Dir Suf│
                         │ 1           DULANEY VALLEY RD        │
                         │ ─────────────────────────(!)   5     │
                         │  1 - M Col Amt   Ship # ID#   Remark │
                         │  1              134561 446    MCM ▮ │
                         │                                      │
                         │                                      │
                         │  Edit    Dup   Ship#<6 PreRec Ovrride│
                         │ ▐PkgInfo NonDel  Notes       Deliver │
                         │              ◉              │ 7:35 │ │
                         └──────────────┬───────────────────────┘
                                        └── 142
```

FIG. 7

SYSTEMS, METHODS, AND COMPUTER PROGRAM PRODUCTS FOR GENERATING REFERENCE GEOCODES FOR POINT ADDRESSES

FIELD OF EMBODIMENTS OF THE INVENTION

Embodiments of the present invention relate generally to systems and methods for generating reference geocode information for a plurality of point addresses, and, more particularly, to systems that capture sample geocodes during the delivery or pickup of an item to or from a point address and use the sample geocodes to generate a reference geocode for the point address.

BACKGROUND OF EMBODIMENTS OF THE INVENTION

Accounting for the tremendous volume of goods flowing through a transportation system on a daily basis creates a significant logistical challenge. As a result, tracking and visibility systems play an integral part in most transportation systems by allowing both customers and transportation personnel to track the flow of goods. However, despite the existence of such prior art systems, items flowing through a transportation system are, on occasion, still delivered to a location later than expected, mis-delivered to an incorrect address, and even lost (or stolen) somewhere along the way. These and other such mishaps can be particularly troubling when the item being shipped is considered a "high-value" item, based on either its relative importance to the shipper or on its raw economic value. Examples of high-value items can include shipments of diamonds, computer chips, cars or sensitive documents, to name just a few.

For the most part, item tracking services known in the art are passive in the sense that they are generally not designed to address the types of problems discussed above. For example, if an item is delivered to an address different from where it was shipped, such as may occur when an item is delivered to the correct street but the wrong number, to the wrong street but the correct number, or to the wrong street and the wrong number, such a problem may go undetected until a shipper or consignee calls to inquire about the whereabouts of the item. By then, however, a substantial amount of time may have passed during which transportation and security personnel could have been looking into the problem. This delay often reduces the likelihood of being able to correct the problem. For example, in some cases, a consignee who actually received the mis-delivered item may later deny having ever received it.

Furthermore, while it may sometimes be possible to ship an item via special shipping channels that incorporate more stringent security measures, doing so may not always be desirable. For example, by shipping the item via special shipping channels, the shipper may in effect be identifying the item to would-be criminals as a high-value item. Thus, in some cases, it may actually be safer to ship the item via standard means so that the item does not stand out as an item of particular value in the various shipping yards, hub locations and other transport points, which the item is likely to pass through.

Therefore, an unsatisfied need exists in the industry for improved systems and methods for monitoring whether an item is properly delivered to a designated delivery point that overcomes deficiencies in the prior art, some of which are discussed above.

BRIEF SUMMARY OF EMBODIMENTS OF THE INVENTION

Embodiments of the present invention provide systems, methods, and computer program products for generating a reference location data set, such as a reference longitude and latitude point, for each of a plurality of point addresses. A reference location data set can be determined for a point address based on a history of prior geocode samples, such as GPS readings, that have been obtained using a portable computing device during a prior delivery to or pickup from the point address. A location data service collects such geocode samples and processes the samples to generate a reference location data set, such as a reference longitude and latitude and a zone of confidence around the reference longitude and latitude, for each unique point address. To determine whether an item is being delivered to a wrong address, current location data, such as a GPS reading, obtained during a delivery can be compared to the reference location data generated by the location data service for the delivery address.

In one embodiment of the present invention, a method is provided for generating reference location data for a plurality of unique point addresses. The method includes receiving a plurality of geocode samples associated with a unique point address. Each geocode sample includes location data captured during a delivery or a pickup of an item addressed to or from the unique point address. The method also includes computing a reference geocode for the unique point address based on at least some of the plurality of geocode samples. In one embodiment, the method includes determining whether an item addressed to the unique point address is being delivered to an incorrect location by comparing a current geocode reading taken proximate a point of delivery to the reference geocode associated with the unique point address.

In one embodiment, the method may include computing a zone of confidence around the reference geocode. The zone of confidence may include a circle of confidence with the reference geocode at the circle's center.

In one embodiment, the plurality of geocode samples and the reference geocode each include longitude and latitude data. For example, the plurality of geocode samples may be made up of Global Positioning System (GPS) records captured by a GPS sensor during the delivery or the pickup of an item addressed to or from the unique point address. In this regard, computing the reference geocode based on the plurality of geocode samples may involve calculating a reference latitude and a reference longitude using the latitude and longitude data of at least some of the plurality of geocode samples.

In one embodiment, at least one of the plurality of geocode samples is captured in response to a predefined trigger event associated with the delivery or pickup process. For example, a geocode sample may be captured by a portable device during the delivery or pickup in response to a predefined trigger event recognized by the device. The predefined trigger event may include, for example, an item scan event, an electronic signature capture event, an input to the portable device indicating that the item has been left at the current location, and/or an input or event that indicates to the device that the delivery or pickup of the item is now complete. The method also may involve assigning relative weights to the plurality of geocode samples based on the type of trigger event associated with each geocode sample, the weights generally providing an indication of the assumed accuracy of the geocode sample based on predefined rules.

In one embodiment, the method involves weighting at least some of the plurality of geocode samples relative to each other based on one or more predefined rules and then computing a mean latitude and a mean longitude by using the relative weights of the plurality of geocode samples to compute a weighted average of the latitude and longitude data associated with at least some of the plurality of geocode samples. In one embodiment where the geocode samples are recorded by a geocode sensor of a portable computing device, where the geocode sensor senses geocode information from a geocode system, and where the portable computing device captures a geocode sample by recording the sensed geocode information in response to at least one predefined trigger event occurring during the delivery or pickup, the method involves weighting at least some of the geocode samples relative to each other based on an amount of time between when the geocode sensor sensed the geocode information and when the trigger event occurred.

In one embodiment, computing the reference geocode based on the plurality of geocode samples involves ignoring geocode samples that are associated with an indication that the delivery or the pickup was unsuccessful.

In one embodiment, the method includes running a nearest neighbor algorithm to eliminate outlying geocode samples from the plurality of geocode samples. In this regard, computing the reference geocode based on the plurality of geocode samples may involve ignoring outlying geocode samples from the plurality of geocode samples, and averaging the remaining geocode samples of the plurality of geocode samples in order to generate a mean-location-without-outliers point for the unique point address. Ignoring outlying geocode samples may involve generating, for each geocode sample, a measure of the density of other geocode samples located in an area around the geocode sample, and determining outlying geocode samples from the plurality of geocode samples based on the measure of the density. Generating, for each geocode sample, a measure of density may involve computing a sum of the squares of the distances between the geocode sample and each of at least some of the other geocode samples.

In one embodiment, the process of computing the reference geocode based on the plurality of geocode samples involves averaging the plurality of geocode samples in order to generate a mean location point. The process may further involve computing a mean distance by averaging the distances that each geocode sample is from the mean location point. The process may also involve ignoring geocode samples of the plurality of geocode samples that are a greater distance from the mean location point than a factor of the computed mean distance, and then averaging any non-ignored geocode samples in order to generate the reference geocode. In one embodiment, where the method further includes generating a circle of confidence, the reference geocode may be used as the center of the circle of confidence. The radius of the circle of confidence may be generated by providing a predefined base radius and adding the base radius to the product of the mean distance and a predefined radius scale factor.

Embodiments of the present invention also provide a system for generating reference location data for a plurality of unique point addresses. The system may include a geocode sample receiving module configured to receive a plurality of geocode samples associated with a unique point address. In general, each geocode sample is been captured during a delivery or a pickup of an item addressed to or from the unique point address. The system may also include a reference location data generating system configured to compute a reference geocode for the unique point address based on the plurality of geocode samples. The reference location data generating system may be further configured to compute a zone of confidence around the reference geocode.

In one embodiment, where at least one of the plurality of geocode samples was captured in response to a predefined trigger event associated with the delivery or pickup process, the reference location data generating system may be configured to compute the reference geocode by weighting the plurality of geocode samples based on the type of trigger event associated with each geocode sample.

In one embodiment, the reference location data generating system is configured to compute the reference geocode by ignoring geocode samples that are associated with an indication that the delivery or the pickup was unsuccessful.

In an embodiment where each geocode sample comprises latitude and longitude data, the reference location data generating system may include an algorithm module configured to compute the reference geocode by calculating a reference latitude and a reference longitude using the latitude and longitude data of at least some of the plurality of geocode samples.

In one embodiment, the geocode samples are recorded by a geocode sensor of a portable computing device, the geocode sensor being configured to sense geocode information from a geocode system. In such an embodiment, the portable computing device may be configured to capture a geocode sample by recording the sensed geocode information in response to at least one predefined trigger event occurring during the delivery or pickup. The reference location data generating system may then include a business logic module configured to weight at least some of the geocode samples relative to each other based on an amount of time between when the geocode sensor sensed the geocode information and when the trigger event occurred.

In one embodiment, the reference location data generating system includes a business logic module configured to weight at least some of the plurality of geocode samples relative to each other based on one or more predefined rules. In such an embodiment, the reference location data generating system may further include an algorithm module configured to compute a mean latitude and a mean longitude by using the relative weights of the plurality of geocode samples to compute a weighted average of the latitude and longitude data associated with at least some of the plurality of geocode samples.

In one embodiment, the reference location data generating system includes an algorithm module configured to run a nearest neighbor algorithm to eliminate outlying geocode samples from the plurality of geocode samples. In this regard, the algorithm module may be configured to ignore outlying geocode samples from the plurality of geocode samples, and then average the remaining geocode samples of the plurality of geocode samples in order to generate a mean-location-without-outliers point for the unique point address. The algorithm module may be further configured to generate, for each geocode sample, a measure of the density of other geocode samples located in an area around the geocode sample, and then determine outlying geocode samples from the plurality of geocode samples based on the measure of the density. The algorithm module may be further configured to compute a sum of the squares of the distances between a geocode sample and each of at least some of the other geocode samples, and then use the sum to generate the measure of the density for the geocode sample.

In one embodiment, the reference location data generating system includes an algorithm module configured to: average the plurality of geocode samples in order to generate a mean location point; compute a mean distance by averaging the distances that each geocode sample is from the mean location point; ignore geocode samples of the plurality of geocode samples that are a greater distance from the mean location point than a factor of the computed mean distance; and average any non-ignored geocode samples in order to generate the reference geocode. In such an embodiment, the algorithm module may be further configured to: use the reference geocode as the center of a circle of confidence; and compute a radius of the circle of confidence by providing a predefined base radius and adding the base radius to the product of the mean distance and a predefined radius scale factor.

The reference location data generating system may include: a get data module configured to reformat geocode sample data received by the geocode sample receiving module; a business logic module configured to apply predefined business logic rules to the geocode sample data in order to generate a weighted database of geocode samples, each geocode sample weighted based on the predefined business logic rules; an algorithm module configured to apply statistical algorithms to the plurality of weighted geocode samples in order to generate the reference geocode; and/or a communication module for providing reference data to one or more other systems.

Embodiments of the present invention also provide a computer program product for generating reference location data for a plurality of unique point addresses. The computer program product includes at least one computer-readable storage medium having computer-readable program code logic stored therein. In one embodiment, the computer-readable program code logic includes: a first code logic configured for receiving a plurality of geocode samples associated with a unique point address; each geocode sample captured during a delivery or a pickup of an item addressed to or from the unique point address; and a second code logic configured for computing a reference geocode for the unique point address based on the plurality of geocode samples. The computer program product may further include code logic configured for computing a zone of confidence around the reference geocode. The computer program product may include code logic configured for ignoring geocode samples that are associated with an indication that the delivery or the pickup was unsuccessful.

In embodiments where the geocode samples are captured in response to one of a plurality of types of trigger events associated with the delivery or pickup process, the computer program product may include code logic configured for weighting the plurality of geocode samples based on the type of trigger event associated with each geocode sample.

In embodiments where each geocode sample includes latitude and longitude data, the computer program product may further include code logic configured for calculating a reference latitude and a reference longitude using the latitude and longitude data of at least some of the plurality of geocode samples.

In one embodiment, the geocode samples are recorded by a geocode sensor of a portable computing device in response to at least one predefined trigger event occurring during the delivery or pickup, the geocode sensor being configured to sense geocode information from a geocode system. In such an embodiment, the computer program product may include code logic configured for weighting at least some of the geocode samples relative to each other based on an amount of time between when the geocode sensor sensed the geocode information and when the trigger event occurred.

In an embodiment where each of the geocode samples include latitude and longitude data, the computer program product may further include: code logic configured for weighting at least some of the plurality of geocode samples relative to each other based on one or more predefined rules; and code logic configured for computing a mean latitude and a mean longitude by using the relative weights of the plurality of geocode samples to compute a weighted average of the latitude and longitude data associated with at least some of the plurality of geocode samples.

In one embodiment, the computer program product includes code logic configured for running a nearest neighbor algorithm to eliminate outlying geocode samples from the plurality of geocode samples. In this regard, the computer program product may include code logic configured for ignoring outlying geocode samples from the plurality of geocode samples; and code logic configured for averaging the remaining geocode samples of the plurality of geocode samples in order to generate a mean-location-without-outliers point for the unique point address. The computer program product may further include code logic configured for generating, for each geocode sample, a measure of the density of other geocode samples located in an area around the geocode sample; and code logic configured for determining outlying geocode samples from the plurality of geocode samples based on the measure of the density. The code logic configured for computing a measure of density for a geocode sample may include code logic configured for computing a sum of the squares of the distances between the geocode sample and each of at least some of the other geocode samples.

In one embodiment, the computer program product includes: code logic configured for averaging the plurality of geocode samples in order to generate a mean location point; code logic configured for computing a mean distance by averaging the distances that each geocode sample is from the mean location point; code logic configured for ignoring geocode samples of the plurality of geocode samples that are a greater distance from the mean location point than a factor of the computed mean distance; and code logic configured for averaging any non-ignored geocode samples in order to generate the reference geocode. In such an embodiment, the computer program product may further include: code logic configured for using the reference geocode as the center of a circle of confidence; and code logic configured for computing a radius of the circle of confidence by providing a predefined base radius and adding the base radius to the product of the mean distance and a predefined radius scale factor.

Embodiments of the computer program product may further include code logic configured for communicating reference location data to one or more remote systems.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 7 illustrates three exemplary display views that may be displayed on the portable computing device of FIG. 1 in response to positive, neutral, and negative mis-delivery feedback events in accordance with an embodiment of the present invention;

Figure 9:
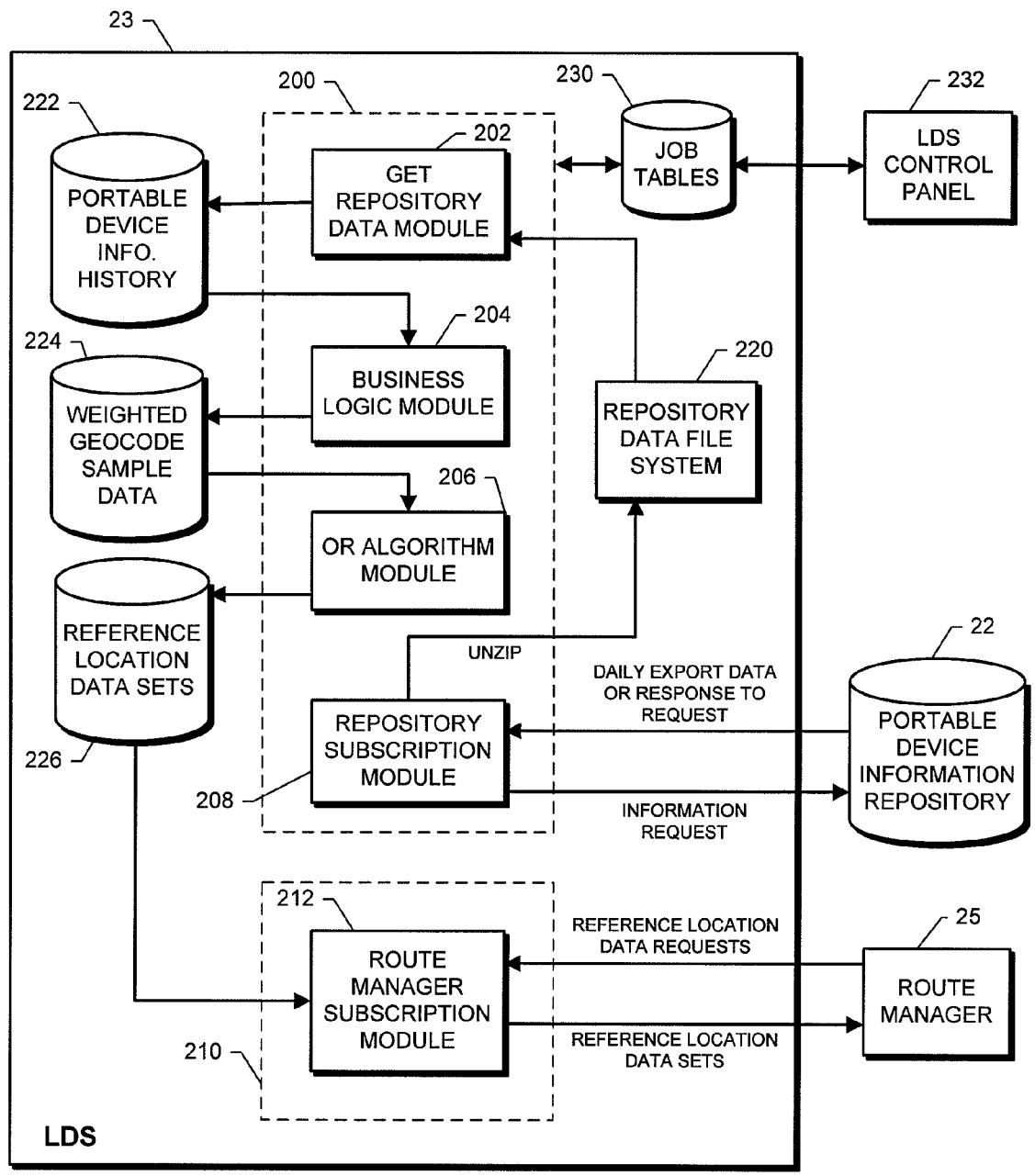
FIG. 9 shows a block diagram of the location data service of FIG. 4 in accordance with an embodiment of the present invention.
Figure 12:
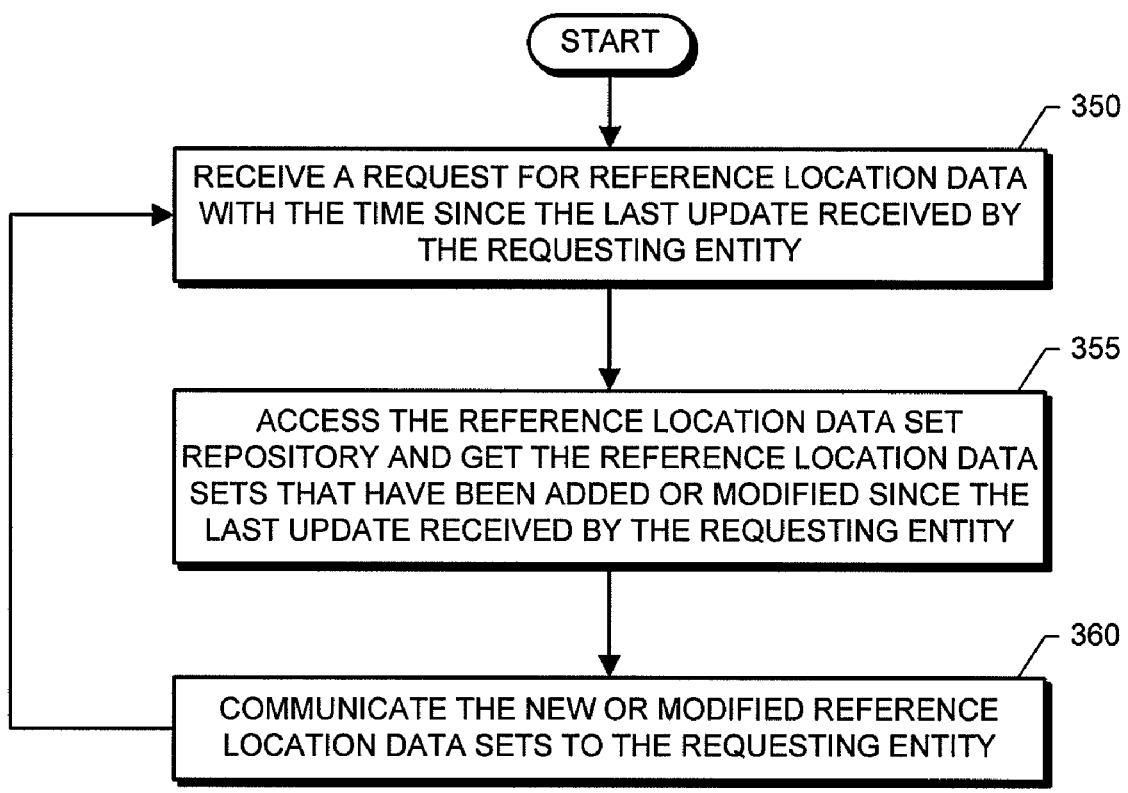
Figure 13A:
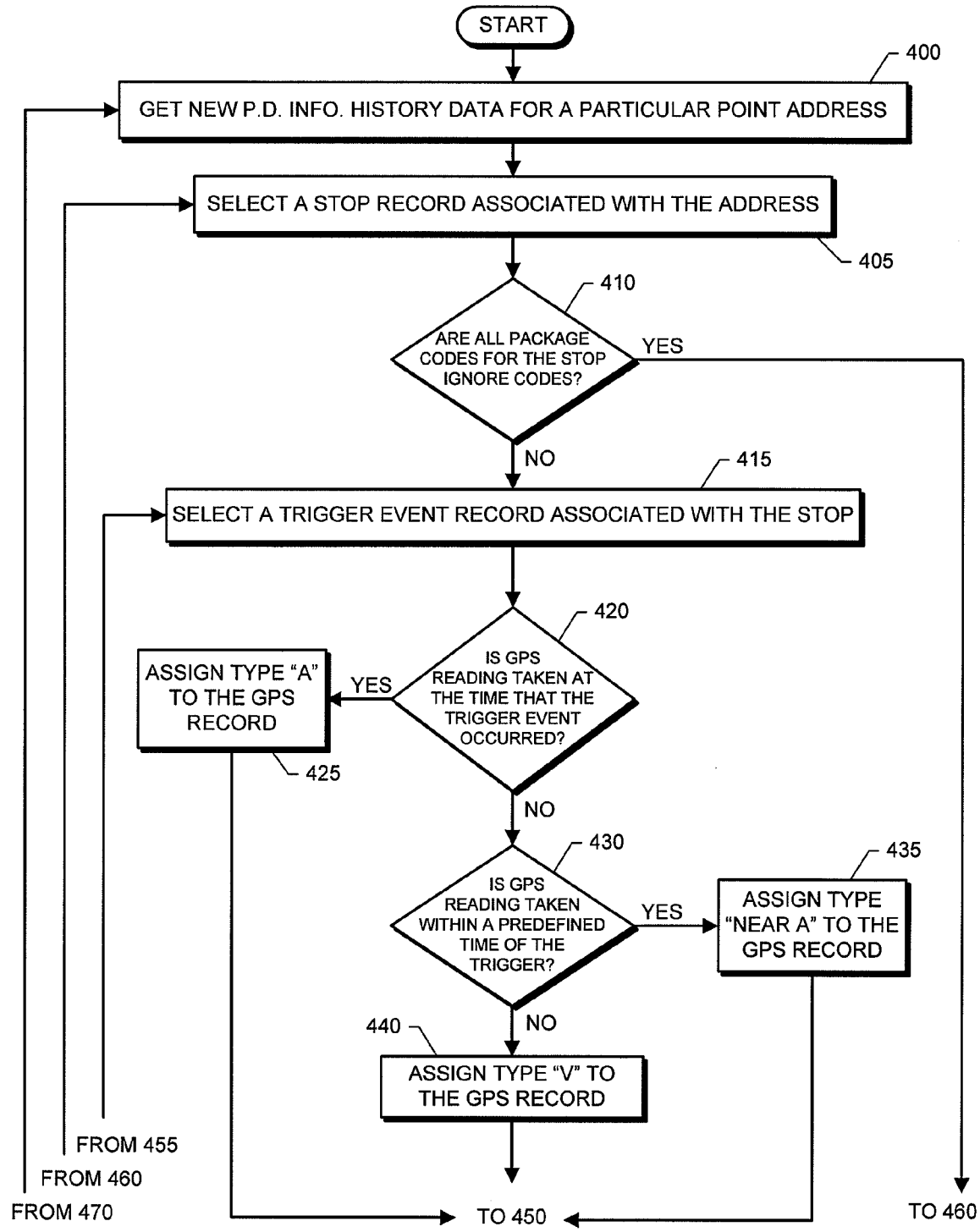
Figure 13B:
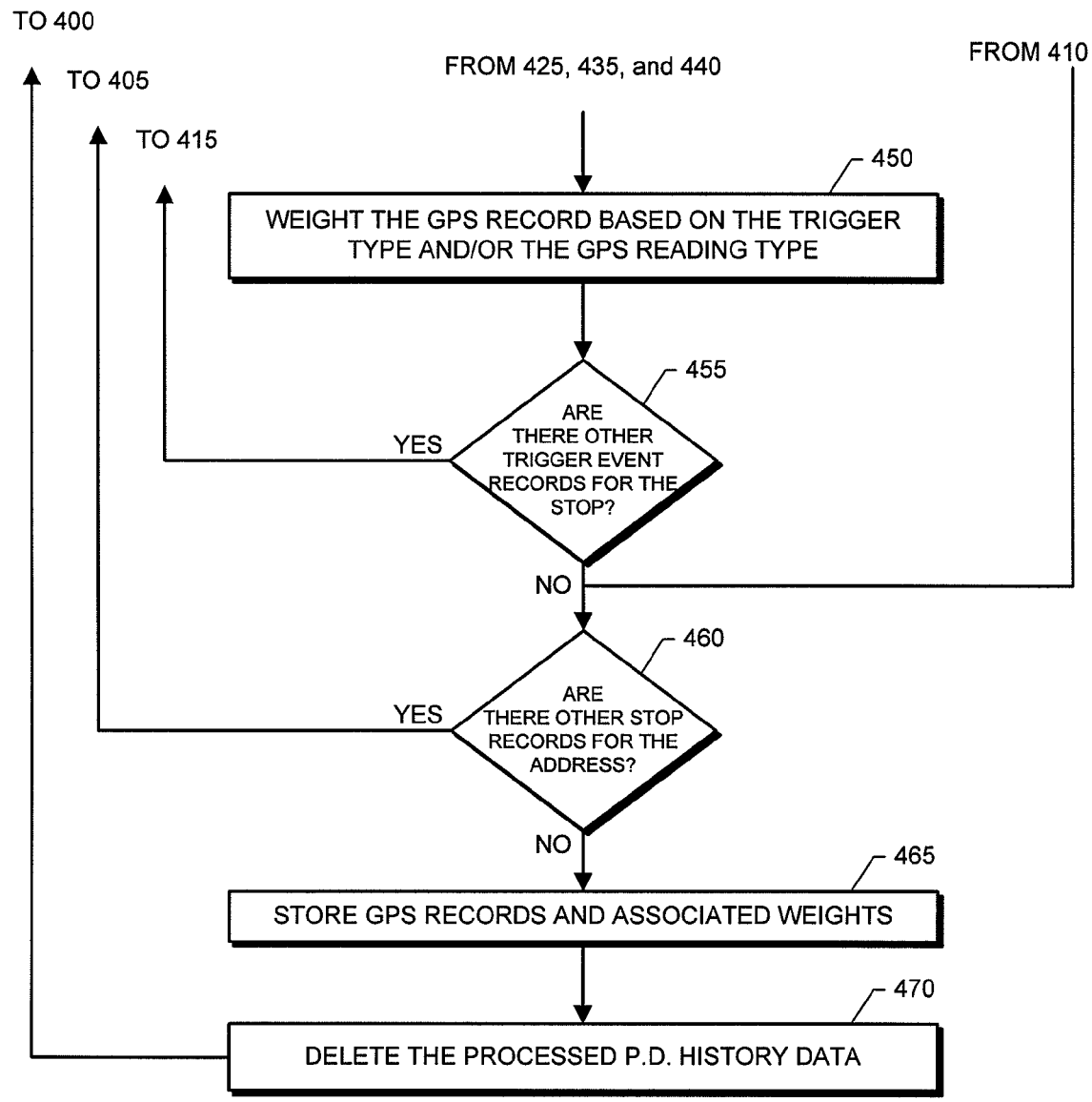
Figure 14:
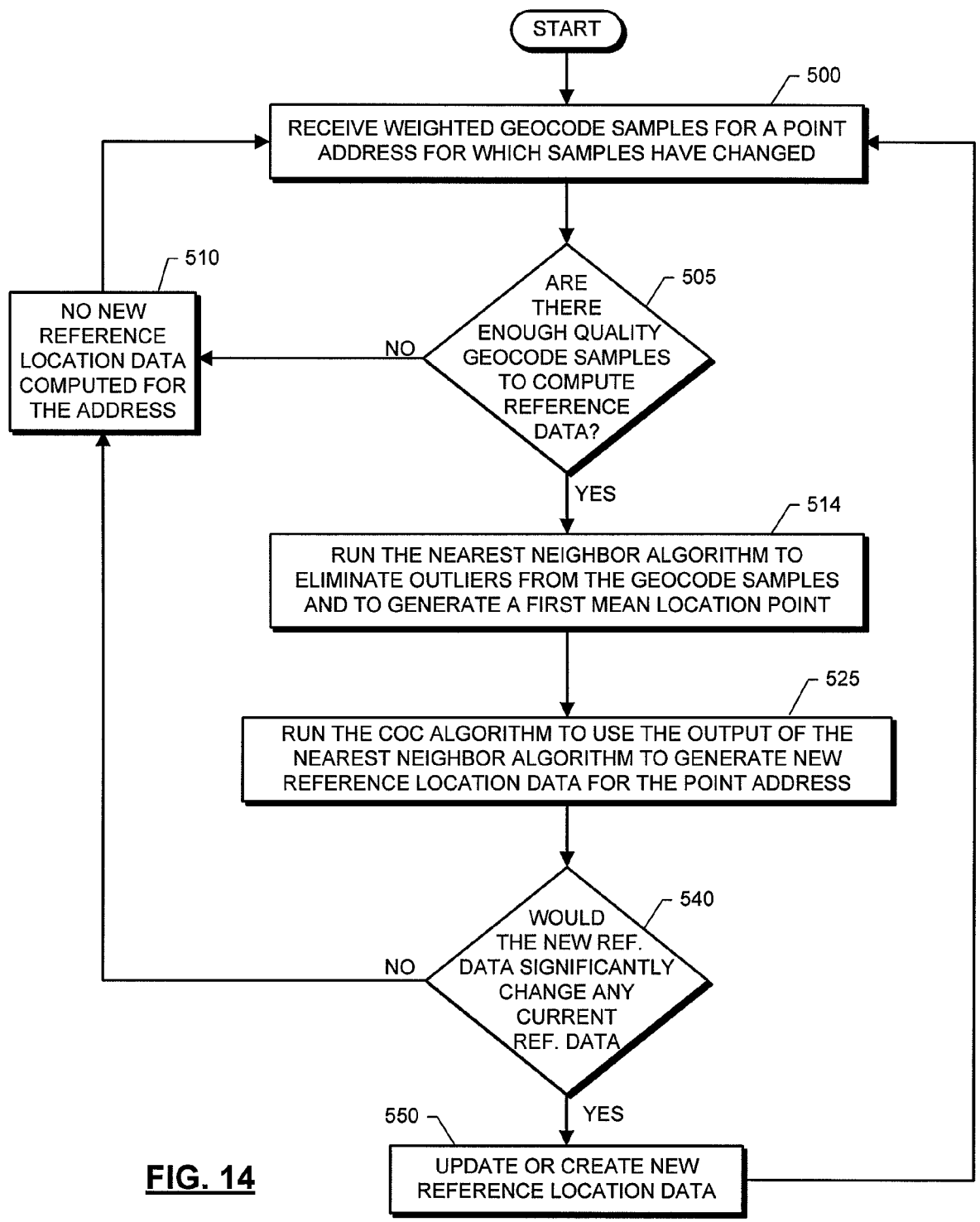
Figure 15:
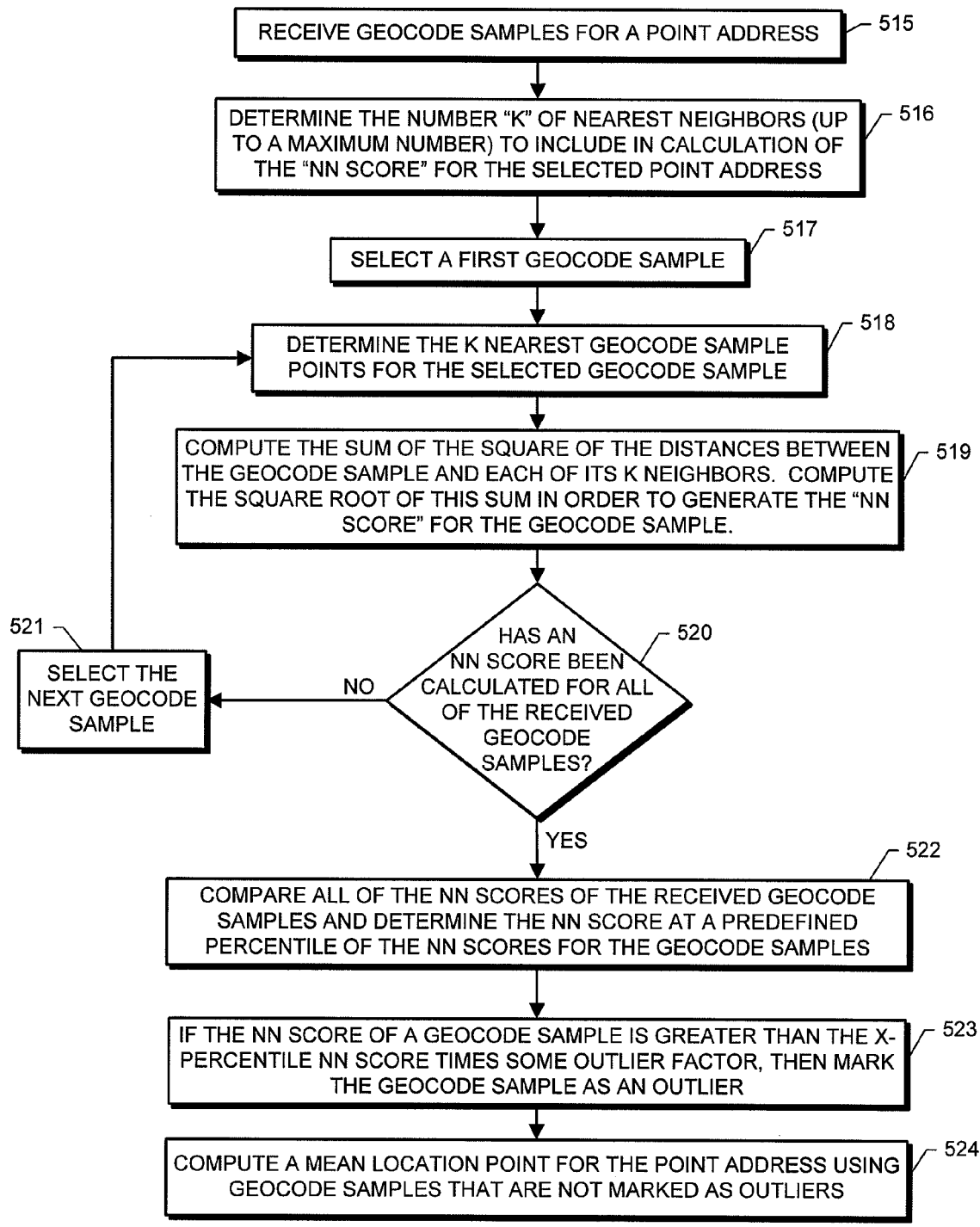
Figure 16:
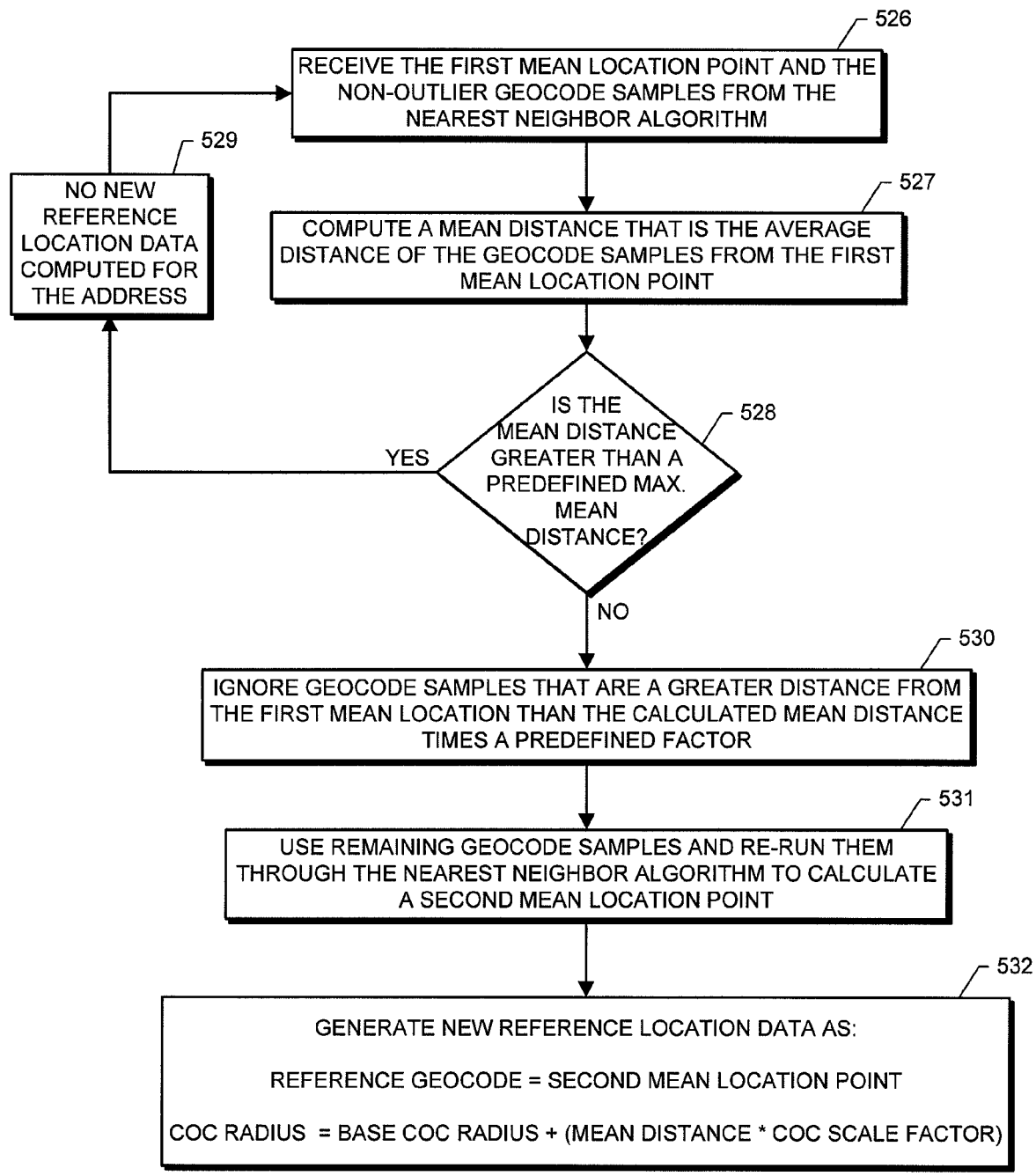

FIG. 12 provides a flow diagram that illustrates the process of providing reference location data to remote requesting entities in accordance with an embodiment of the present invention;

FIGS. 13A-13B show a flow diagram that illustrates the process executed by the business logic module of FIG. 9 in accordance with an embodiment of the present invention;

FIG. 14 shows a flow diagram that illustrates the process executed by the OR algorithm module of FIG. 9 in accordance with an embodiment of the present invention;

FIG. 15 shows a flow diagram that illustrates the process executed by the OR algorithm module when it runs the nearest neighbor algorithm mentioned in FIG. 14, in accordance with an embodiment of the present invention; and FIG. 16 shows a flow diagram that illustrates the process executed by the OR algorithm module when it runs the COC algorithm mentioned in FIG. 14, in accordance with an embodiment of the present invention.

DETAILED DESCRIPTION OF EMBODIMENTS THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of methods, apparatus (i.e., systems), and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the system or flowchart blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

A. Delivery Monitoring System

Figure 1:
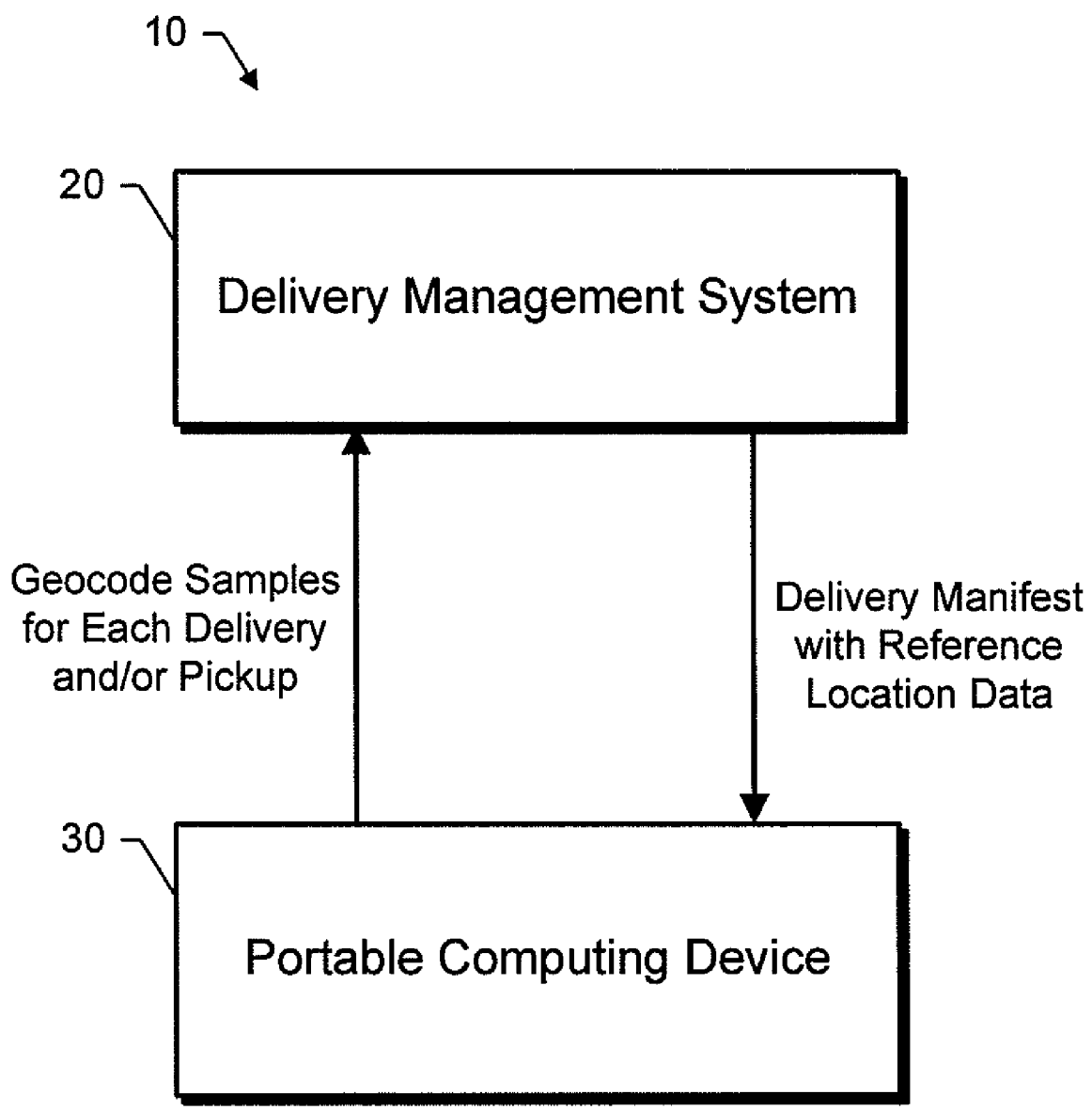
FIG. 1 shows a high level block diagram of a delivery monitoring system that can be used for detecting whether an item is being delivered to the wrong address in accordance with an embodiment of the present invention.

FIG. 1 shows a high level block diagram of a delivery monitoring system 10 that can be used for detecting whether an item is being delivered to the wrong address. In recent years, the delivery of mail, packages, shipments and other such items has been assisted by portable handheld devices that maintain address and delivery related data. Such portable devices have been used by delivery companies to hold delivery manifests for a driver associated with the portable device and to allow the driver to scan barcode labels, RFID tags, or other machine-readable labels associated with the delivery items. For example, UPS drivers have carried a delivery information acquisition device (DIAD) unit since the early 1990's. Since its introduction, UPS drivers have used the DIAD unit to collect package information. Recent versions of the DIAD unit are equipped with cellular and wireless radios and thereby allow the transmission of package data directly between the DIAD unit and the central storage facility.

The inclusion of Global Positioning System (GPS) receivers in such portable devices further provides the ability to maintain and process location data, such as latitude and longitude data, for locations to which items are delivered (or picked up). Accordingly, in one embodiment of the present invention, a portable computing device 30 can be used to determine whether an item is being delivered to the wrong address by, for example, comparing a current GPS reading with a reference geocode (e.g., a reference latitude and longitude location) associated with the designated delivery address. As used herein, a geocode refers to a code or other indicator that can be used to indicate a location in geographic space. For example, a geocode may indicate a location by specifying the latitude and longitude of the location. In this regard, in one example, the geocode may include a GPS record. In one embodiment, if the distance between the current GPS reading and the reference geocode exceeds a predefined threshold, i.e., if delivery of the item appears to be occurring outside of a predefined zone of confidence around the reference geocode, then the portable computing device 30 can be configured to notify the driver that a potential mis-delivery may be occurring.

To achieve this capability, processes implemented in accordance with embodiments of the present invention include developing a reference location data set (e.g., a reference geocode and/or a zone of confidence) for each point address to which an item may be delivered. In one embodiment, this can be accomplished by using the portable computing device 30 to gather geocode samples, such as GPS readings, at each delivery or pickup address over a period of time. This data can then be uploaded to a delivery management system 20, which, after an appropriate number of geocode samples, processes the sample data and creates a reference location data set for each delivery address. Such a reference location data set may include a reference geocode (e.g., a reference latitude and longitude) and related metrics (e.g., information defining a zone of confidence about the reference geocode). The reference location data set for each delivery address in a delivery manifest can then be downloaded to the portable computing device 30 for use in detecting mis-deliveries, as described above.

Thus, at a high level, the architecture shown in FIG. 1 involves creating a pipeline for geocode samples (e.g., GPS readings) to flow from the portable computing device 30 to the delivery management system 20 and for reference location data (i.e., reference geocodes and related metrics) to flow back to the portable computing device 30 for use in detecting the occurrence of mis-deliveries. The general concept is to create a repository of geocode samples and reference location data sets and associate this location data with a point address (e.g., a potential delivery location). Then, as a unit of work (UOW) manifest (e.g., a delivery manifest) is created for the portable computing device 30, as is commonly done in the package delivery industry, the appropriate reference location data set (e.g., a reference geocode and related metrics) can be attached to each UOW for use in detecting whether an item (e.g., a letter, package, shipment, etc.) is being delivered to the wrong address.

Figure 2:
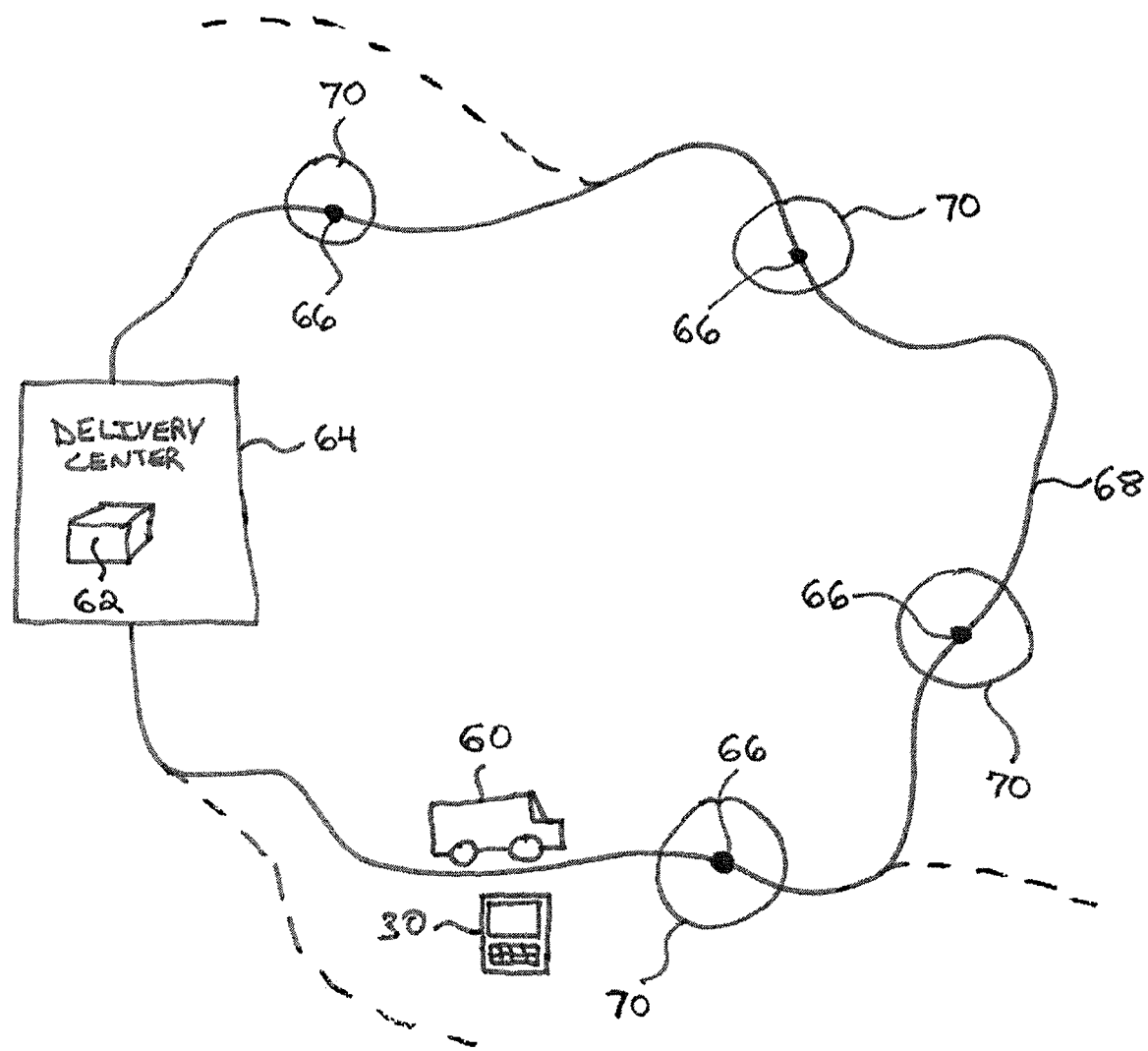
FIG. 2 shows a graphical illustration of how the delivery monitoring system of FIG. 1 can be used to detect the occurrence of mis-deliveries along a package delivery route in accordance with an embodiment of the present invention.

FIG. 2 shows a graphical illustration of how the delivery monitoring system 10 of FIG. 1 can be used to detect the occurrence of mis-deliveries along a package delivery route, in accordance with one embodiment of the present invention. It should be noted that while certain aspects of embodiments of the present invention may be described in the context of a package delivery system, one of ordinary skill in the art will readily recognize that the monitoring systems described herein would be equally advantageous with other types of delivery systems as well. In FIG. 2, a delivery vehicle 60 is shown transporting items 62 (e.g., packages) from a delivery center 64 to a plurality of designated delivery points 66 located along a delivery route 68. To assist in the delivery of such items, the driver of the delivery vehicle 60 carries a portable computing device 30 (or other such device) that maintains address and delivery data. As mentioned above, the portable computing device 30 can be configured to collect and process location data for use in determining whether an item is being delivered to the wrong address.

More specifically, the portable computing device 30 can be configured to collect geocode samples (e.g., GPS readings) when the device recognizes the occurrence of one or more predefined trigger events. Such predefined trigger events may include, but are not limited to: (1) the first package scan event for a stop; (2) an electronic signature capture event; (3) an input to the device indicating that the driver has left a particular package at the current location (e.g., without capturing a signature); (4) an input or event that indicates to the device that the current stop is now complete; and/or (5) an input specifically instructing the device to capture a geocode sample. Thus, at each designated delivery stop 66, one or more geocode samples, e.g., GPS readings, may be taken by the portable device 30 in response to respective trigger events. As mentioned above, the newly captured geocode samples can be stored and, at some point, uploaded to the delivery management system 20 for use in generating a reference location data set (e.g., a reference geocode and/or a zone of confidence) for each such point address. For example, the delivery management system 20 may be configured to calculate a reference geocode for an address, the reference geocode including the mean latitude and mean longitude of the geocode samples associated with that address. The reference location data set assigned to each address can then be used to provide feedback to the driver (or a remote monitoring system) on whether or not a potential mis-delivery may be occurring at a delivery stop. In one embodiment, this can be accomplished by determining whether delivery (or pickup) of an item is occurring within a zone of confidence, which, in one embodiment, may be circle of confidence 70, defined about the reference longitude and latitude assigned to the address.

Figure 3:
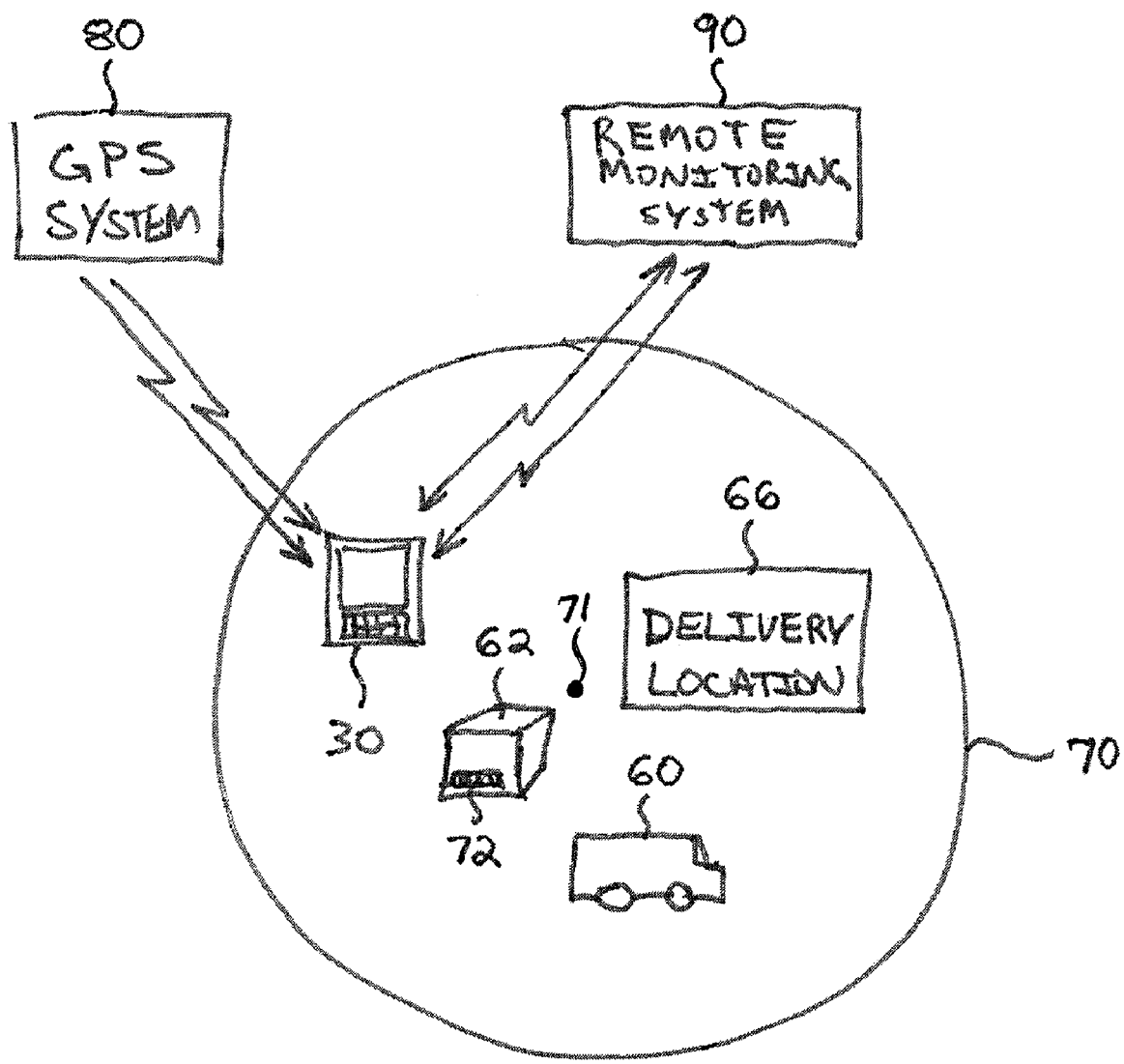
FIG. 3 shows a graphical illustration of how the portable computing device of FIG. 1 can be used to collect location data and process mis-delivery data at a delivery location in accordance with an embodiment of the present invention.

FIG. 3 shows a graphical illustration of how the portable computing device 30 of FIG. 1 can be used to collect and process mis-delivery data at a delivery location 66 in accordance with one embodiment of the present invention. In the illustrated embodiment, the circle of confidence 70 shown around the reference latitude and longitude 71 for the delivery address defines an area or zone within which delivery of the item 62 is considered acceptable (i.e., if delivery occurs within this zone, it is assumed that the item is being delivered to the correct address). It may be seen that, in the illustrated embodiment, the zone of confidence (e.g., the circle of confidence 70) may be circular. However, in other embodiments, a non-circular shaped zone of confidence could be used if logistically appropriate. Different shapes can be achieved by, for example, defining appropriate metrics in association with the reference geocode assigned to the current delivery address. In some cases, this may allow the monitoring system 10 to provide a more precise determination of whether or not delivery of the item 62 is occurring "on" or "off" the property. It should therefore be understood that it is not critical that the zone of confidence 70 described herein be circular in all cases, but rather can take a variety of shapes (square, rectangular, irregular, etc.) to adapt to the needs of a particular application.

When the driver of the delivery vehicle 60 arrives at a location where the item 62 will be delivered, the portable computing device 30 performs mis-delivery data collection and processing in association with that stop. Mis-delivery data collection and processing can be performed each time an appropriate GPS trigger event occurs. As described above, GPS trigger events may include, but are not limited to, the first package scan event for a stop, an electronic signature capture event, an input to the device 30 indicating that a package or item has been left at the current location (i.e., without capturing a signature), and an input or event that indicates to the device that the current stop is now complete. For example, mis-delivery data collection and processing may be initiated when the driver of the delivery vehicle 60 uses the portable device 30 to scan a label (e.g., a barcode, RFID tag, etc.) 72 associated with the item 62. In response to this action, the portable device 30 obtains the most recent GPS location data that it has received from a remote GPS system 80. The portable device 30 can then perform a proximity calculation to determine what type of feedback should be provided to the driver. In some cases, feedback information and other delivery data may be provided to a remote monitoring system 90 in real time via a wireless link.

Generally described, in one embodiment, the proximity calculation compares the current GPS location data to a corresponding reference location data set that is associated with the current unit of work (e.g., the delivery of the item 62), to determine whether a potential mis-delivery may be occurring. In one embodiment, the proximity distance computed at each GPS trigger point can be calculated as follows: Proximity Distance=(RadiusOfEarth)*a cos [cos(GPSLat)*cos(RefLat)*cos(GPSLong−RefLong)+sin(GPSLat)*sin(RefLat)], where GPSLat is the latitude received from the current GPS reading, GPSLong is the longitude received from the current GPS reading, RefLat is the reference latitude for the delivery address which is the latitude of the reference geocode, RefLong is the reference longitude for the delivery address which is the longitude of the reference geocode, and RadiusOfEarth is approximately 6378 km or 3963 (statute) miles. Where, for example, the reference location data set comprises a circle of confidence 70 with the center of the circle being the latitude and longitude specified by the reference geocode, if the proximity distance is less than the radius of the circle of confidence 70 (i.e., the current delivery location appears to be inside the circle), the portable computing device 30 can be configured to provide "positive" feedback to the driver (i.e., audio, visual or otherwise). On the other hand, if the proximity distance is greater than the radius of the circle of confidence 70 (i.e., the current delivery location appears to be outside of the circle), the portable device 30 can be configured to provide "negative" feedback. In all other cases, the device 30 can be configured to provide some form of "neutral" feedback or no feedback at all.

Calculating a proximity distance is one example of how, in one embodiment, the portable device 30 may determine whether current GPS location data falls within the zone of confidence for a particular address. In other embodiments, other techniques may be used to compare the current latitude and longitude data from a current GPS reading to the reference latitude and longitude of the reference geocode and/or the zone of confidence border. Furthermore, in addition to conducting a proximity calculation or otherwise comparing the current GPS data to the zone of confidence, at appropriate trigger events during a delivery the most recent GPS reading may be stored in the portable device 30 and, at some point, uploaded to the delivery management system 20 as a geocode sample for potential use in the generation of a reference location data set for the associated delivery address. The systems and methods for using the geocode samples to generate reference location data, such as reference geocodes and zones of confidence, are described in greater detail below. Furthermore, although embodiments of the present invention are described herein as using GPS, other similar types of positioning systems may be used to generate the position data used for comparing a current position to a reference position or for generating geocodes samples.

Figure 4:
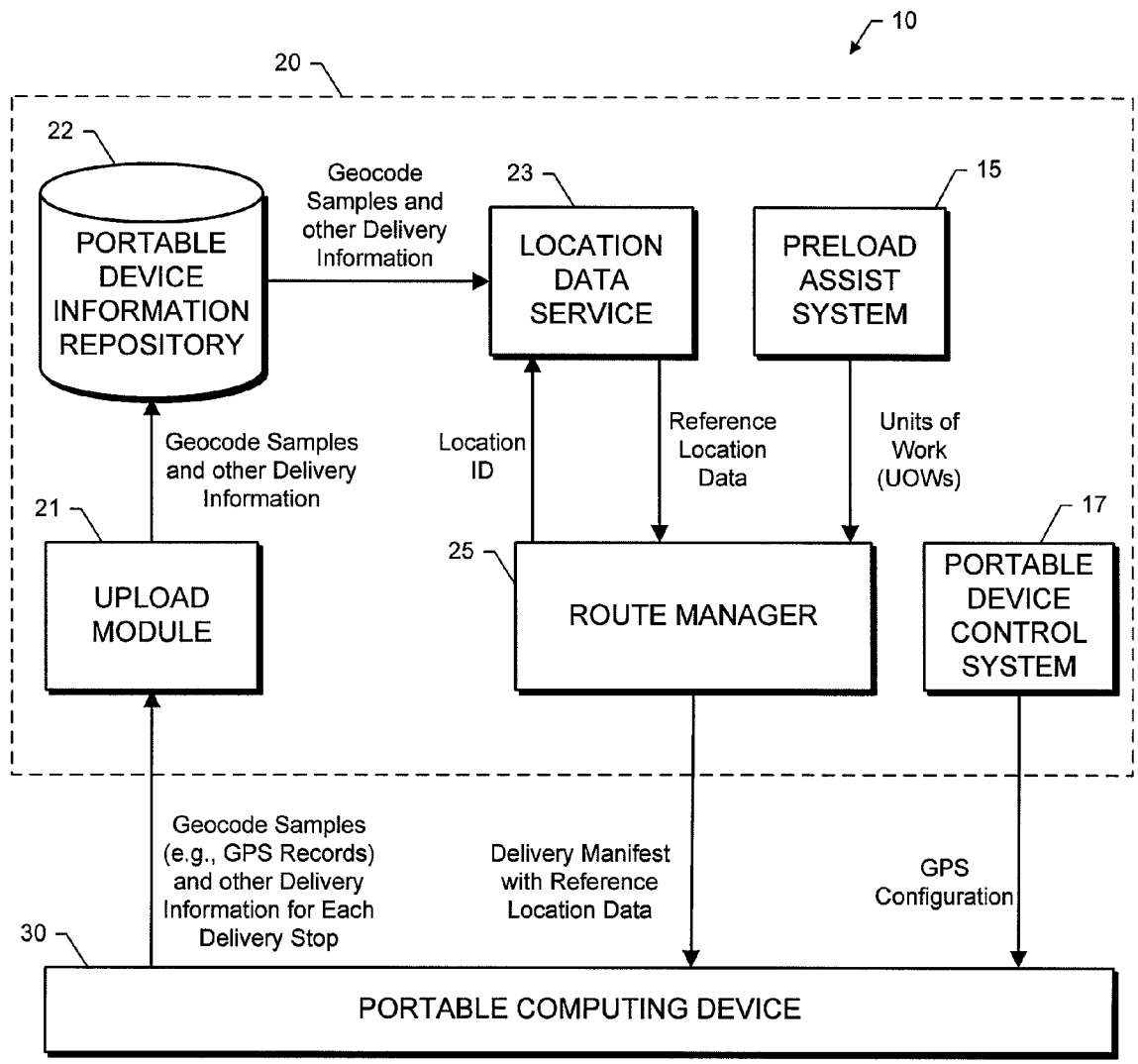
FIG. 4 shows a high level block diagram of the delivery management system of FIG. 1 in accordance with an embodiment of the present invention.

FIG. 4 shows a more detailed block diagram of the delivery monitoring system 10 of FIG. 1 in accordance with one embodiment of the present invention. In addition to other delivery management functions the delivery monitoring system 10 has at least two primary functions related to using geocodes to detect potential mis-deliveries: (1) to generate a reference location data set (e.g., a reference geocode and/or a zone of confidence) for each point address to which an item may be delivered; and (2) to provide such reference location data sets to the portable computing device(s) 30 for on-road use in detecting potential mis-deliveries. To accomplish these objectives, the delivery management system 20 includes an upload module 21 that uploads the on-road collected geocode samples (e.g., GPS records) and other related delivery or geocode information from the portable computing device(s) 30 and exports this data to a portable device information repository 22. The portable device information repository 22 is basically used for storing delivery information collected by the portable devices 30 for each unique point address, including the geocode samples (e.g., GPS latitude/longitude records) collected by the portable devices 30 during past deliveries (or pickups).

Note that, although embodiments of the present invention are described herein generally with respect to deliveries, embodiments of the present invention may also apply to pickups. For example, geocode samples may be generated when an item is picked up at a point address by a delivery service in addition to when an item is delivered to a point address.

Referring again to FIG. 4, in one embodiment, each on-road collected data set (e.g., geocode samples and other delivery and geocode information) includes a unique location identifier (e.g., a unique point address or a unique code for a unique point address) that allows the upload module 21 to know which location the geocode sample(s) and other information applies to. This allows each new on-road collected data set to be associated with an associated point address. In addition to geocode samples, each on-road collected data set may include other relevant delivery information, such as, for example, the type of trigger event that led to the geocode sample being taken, the time/date when the geocode sample was taken, the time/date when the trigger event occurred, and the type of feedback (if any) that was provided in association with the sample, to name just a few. A more detailed description of the delivery information that may be included in an on-road collected data set is described below in accordance with embodiments of the present invention.

As illustrated in FIG. 4, the delivery management system 20 includes a location data service (LDS) 23 that receives geocode samples and other delivery information from the portable device information repository 22 and uses this information to generate a reference location data set for each unique point address. In one embodiment, each reference location data set generated by the LDS 23 in association with a point address includes a reference geocode and corresponding zone of confidence information. In one embodiment, the zone of confidence information includes a radius that defines a circle of confidence about the reference geocode (e.g., the reference latitude and longitude). As indicated above, if delivery of an item occurs within the associated zone of confidence, it is generally assumed that the item is being delivered to the correct address. In one embodiment where the zone of confidence is a circle, the radius that defines the size of the circle of confidence can be a fixed value for all potential delivery stops. In such an embodiment, the radius may be stored generally in the portable device 30 and, in one embodiment, might not be associated with a particular point address or communicated in the reference location data sets received by the portable device 30 from the LDS 23. In another embodiment, the value of the radius may be customized for each point address based on the distribution of geocode samples or on additional information, such as whether a particular stop is a large commercial complex with various access points or a residential delivery stop where different addresses are relatively close together.

In one embodiment, to compute the reference location data set for each point address, the LDS 23 periodically queries the portable device information repository 22 for new geocode samples or periodically checks for location data in the information repository 22 that has changed since the last query. In other embodiments, the LDS 23 requests specific information from the portable device information repository 22 using, for example, an appropriate location identifier (e.g., a unique point address). In response to the query, the portable device information repository 22 may return a history of past geocode samples (e.g., GPS readings) that are associated with unique point addresses. As will be described in greater detail below, the portable device information repository 22 may also return other delivery information associated with the unique point addresses and/or information about the geocode samples themselves.

In one embodiment, when generating an appropriate reference location data set for a point address, the LDS 23 basically performs a two-step process on the returned set of historical geocode samples. First, the LDS 23 tries to eliminate or remove any outliers from the raw set of historical geocode samples by applying, for example, a "nearest neighbor" algorithm. As is known to those of ordinary skill in the art, the nearest neighbor algorithm falls under the general umbrella of distance based outlier detection techniques, which can be used for detecting and eliminating outliers from a data set, such as the set of historical geocode samples provided to the LDS 23. Generally described, such techniques allow for the detection of outliers by looking at how far a given point is from the other points within the data set. Thus, the term "outlier" generally refers to a particular observation or data point that lies an abnormal distance away from the main mass of data points within the overall data set. Because it can be assumed that these data points (i.e., these outliers) are likely to represent inaccurate or false readings, it may be preferable to remove them from the data set before computing the mean latitude and longitude and/or other statistical parameters for the particular point address. This initial step is referred to herein as "scrubbing" the raw data set to produce a clean data set, which presumably provides a more accurate depiction of what is being measured.

With the outliers removed, the LDS 23 can then apply various statistical techniques to the clean data set to determine the reference latitude and longitude (i.e, the reference geocode) of the remaining historical geocode samples. Other useful statistical parameters can be computed as well, including, for example, the variance, which is a measure of how spread out the distribution of the data points is. In one embodiment, the variance (or other such parameters) may be used in customizing the size of the zone of confidence (e.g., the radius of a circle of confidence) for a particular point address. For example, if the variance associated with a particular address is small, the zone of confidence about the corresponding reference geocode may be defined to encompass a smaller area. Similarly, if the variance is large, the zone of confidence may need to be defined to encompass a larger area in order to keep the number of false alarms below an acceptable threshold. After the reference location data has been computed for the identified point address, the LDS 23 stores the information set in a reference location data set repository (not shown).

The route manager 25 is generally responsible for compiling a delivery manifest that lists all units of work (UOWs) that a delivery driver is expected to perform over the course of his or her workday. The route manager 25 may receive the UOWs from, for example, a preload assist system 15. As is commonly done in the package delivery industry, the UOWs for a driver are downloaded to the driver's portable device 30, in the form of a delivery manifest, to assist the driver in knowing where and sometimes when to deliver (or pickup) each item along the driver's delivery route. To augment the traditional address and delivery data that would normally be provided in association with each UOW, the LDS 23 allows the route manager 25 to obtain the appropriate reference location data, such as the reference geocode and, in some embodiments, other information such as zone of confidence information, for the point address associated with each UOW. In one embodiment, this can be accomplished by having the route manager 25 submit a request to the LDS's reference location data repository for location data based on the location identifier (e.g., the unique address or address ID code) associated with each UOW. After all available reference location data has been retrieved for each UOW, the route manager 25 may download the delivery manifest (including the reference location data) to the appropriate portable device 30. The portable device 30 is then able to use the reference location data to perform mis-delivery detection processing during the delivery as described herein.

In one embodiment, the delivery management system 20 includes a portable device control system 17 configured to communicate with the portable computing device 30. The portable device control system 17 communicates configuration information to the portable device 30, which may include GPS configuration information.

B. Portable Computing Device

Figure 5:
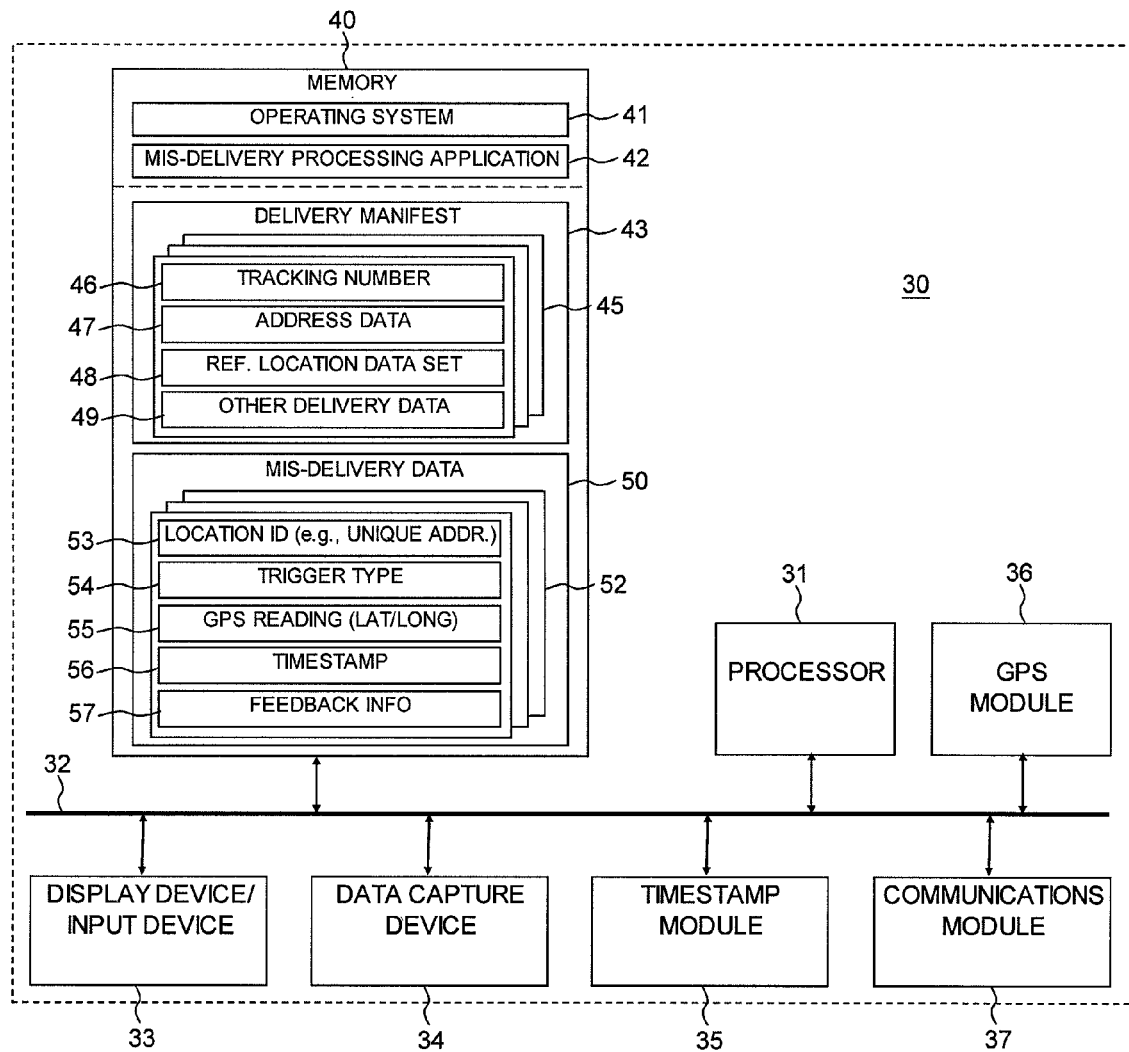
FIG. 5 shows a high level block diagram of the portable computing device of FIG. 1 in accordance with an embodiment of the present invention.

FIG. 5 shows a high level block diagram of the portable computing device 30 of FIGS. 1 and 4 in accordance with one embodiment of the present invention. The portable device 30 includes a processor 31 that communicates with other elements within the device via a system interface or bus 32. Also included in the portable device 30 is a display device/input device 33, a data capture device 34, and a timestamp module 35 that can be used to associate time and date information with each data capture event. The display device/input device 33 may be, for example, a keyboard, touchpad, touch screen, or pointing device that is used in combination with a display screen or monitor. The data capture device 34 may be a barcode reader, a RFID interrogator, or any other type of automated or manual data capture device that is known in the art. The portable computing device 30 further includes a GPS module 36 for receiving and processing GPS data, and a communications module 37 that allows the processor 31 to communicate wirelessly (or otherwise) with remote devices and systems, using for example, one of the IEEE 802.11 protocols, 802.15.4 protocol, or a standard 3G wireless telecommunications protocol, such as CDMA2000 1x EV-DO, GPRS or W-CDMA. The communications module 37 also facilitates the downloading and uploading of delivery/location data to and from the device 30.

The GPS module 36 may include a GPS sensor that is configured to acquire, for example, a latitude, longitude, altitude, course, speed, universal time (UTC), and date, wherein such data may be acquired in National Electrical Manufacturers Association (NEMA) data format or other appropriate data format. As will be appreciated by one skilled in the art, the GPS sensor 310 acquires data, sometimes known as ephemeris data, identifying the number of satellites in view and the relative positions of those satellites. In addition, data regarding, for example, heading and ETA can also be captured, which enhances the determination of the position of the GPS sensor and allows an area to be profiled or segmented based on the common characteristics of the data.

The computing device 30 further includes memory 40, which can be used to store a number of program modules and data items, such as an operating system 41, a mis-delivery software application 42, and a downloaded delivery manifest 43. The mis-delivery application 42 is used for controlling the functionality associated with both the collection and processing of position readings (i.e., geocode samples) taken in response to each predefined trigger event. As mentioned above, the downloaded delivery manifest 43 generally includes a list of the items that are to be delivered (or picked up) by the driver over the course of his or her workday. In one embodiment, each UOW 45 listed in the delivery manifest 43 includes a tracking number 46, address data 47, and a corresponding reference location data set 48. Each reference location data set 48 may include a reference geocode (e.g., a latitude and longitude reference point) and one or more metrics that define a corresponding zone of confidence, within which delivery of a related item is considered acceptable. Each UOW 45 may also include other delivery related data 49, such as instructions on whether to release an item without a signature, instructions on where to leave the item if a recipient is not present, and instructions on whether the item is scheduled to be delivered by a certain time, to name just a few.

The memory 40 also includes a mis-delivery data collection storage area 50 used for storing geocode sample data sets, such as GPS location data sets 52, which are collected in association with each GPS trigger event detected by the device 30. In the embodiment shown, each GPS location data set 52 includes: a location identifier (e.g., a unique address or address code) for identifying where the GPS reading is believed to have been taken (i.e., the intended delivery address); a trigger type for identifying the type of GPS trigger event that facilitated the GPS data capture event; a GPS location reading (e.g., a latitude and longitude reading) obtained in response to such event; timestamp data for identifying the approximate time/date when the event occurred and the time of the GPS reading if different from the time of the trigger event; and feedback information for identifying the type of feedback (if any) that was issued by the device 30. The memory 40 can be considered either primary memory, that is RAM or other forms which retain the contents only during operation, or it may be non-volatile, such as ROM, EPROM, EEPROM, FLASH, or other types of memory that retain the memory contents at all times. The memory 40 could also be secondary memory, such as disk storage, that stores a large amount of data.

As described above, in one embodiment, the timestamp data of each GPS location data set 52 may further include information related to the "age" of the GPS reading recorded in response to a trigger event. In this regard, the GPS module 36 may be configured to continuously or periodically store temporary GPS readings, regardless of whether a trigger event has occurred. This may be beneficial since GPS readings may not always be available at any given moment in time since the GPS signal could be temporarily blocked by a nearby object or device or otherwise unavailable. If a trigger event occurs at a moment in time when the GPS module 36 cannot immediately obtain a GPS reading, the last GPS reading (or in some embodiments the next GPS reading) obtained by the GPS module 36 may be associated with the current trigger event in place of a GPS taken at the same time as the trigger event. In such an embodiment, the portable device 30 may store information about the time of the GPS reading and the time of the associated trigger event so that the delivery management system 20 may use such information in determining the "accuracy" of the GPS reading. The portable device 30 may store this information in a number of different ways. For example, in one embodiment, the time of the GPS reading may be stored in addition to the time of the associated trigger event. In another embodiment, the time between the trigger event and the associated GPS reading may be recorded.

Although the portable computing device 30 is generally described herein as comprising a handheld computer and/or scanner, in other embodiments, the portable computing device 30 may include other devices. For example, in some embodiments, sensors may be installed on or about the delivery vehicle, such as on the engine, doors, and other electrical components of the vehicle so as to allow the portable computing device 30 to gather additional package delivery details, GPS readings, and/or other position data and delivery data. The sensors may communicate with the portable device 30 or may communicate directly with the delivery management system 20 via a wired or wireless communication network. In another example, one or more user interface devices may be installed on or about the delivery vehicle, so as to allow communication between the driver and the portable computing device 30 and/or the delivery management system 20. For example, a heads-up display may be provided for the driver in order to present information, such as mis-delivery feedback information, to the driver as the driver is sitting in the driver's seat of the delivery vehicle.

Figure 6A:
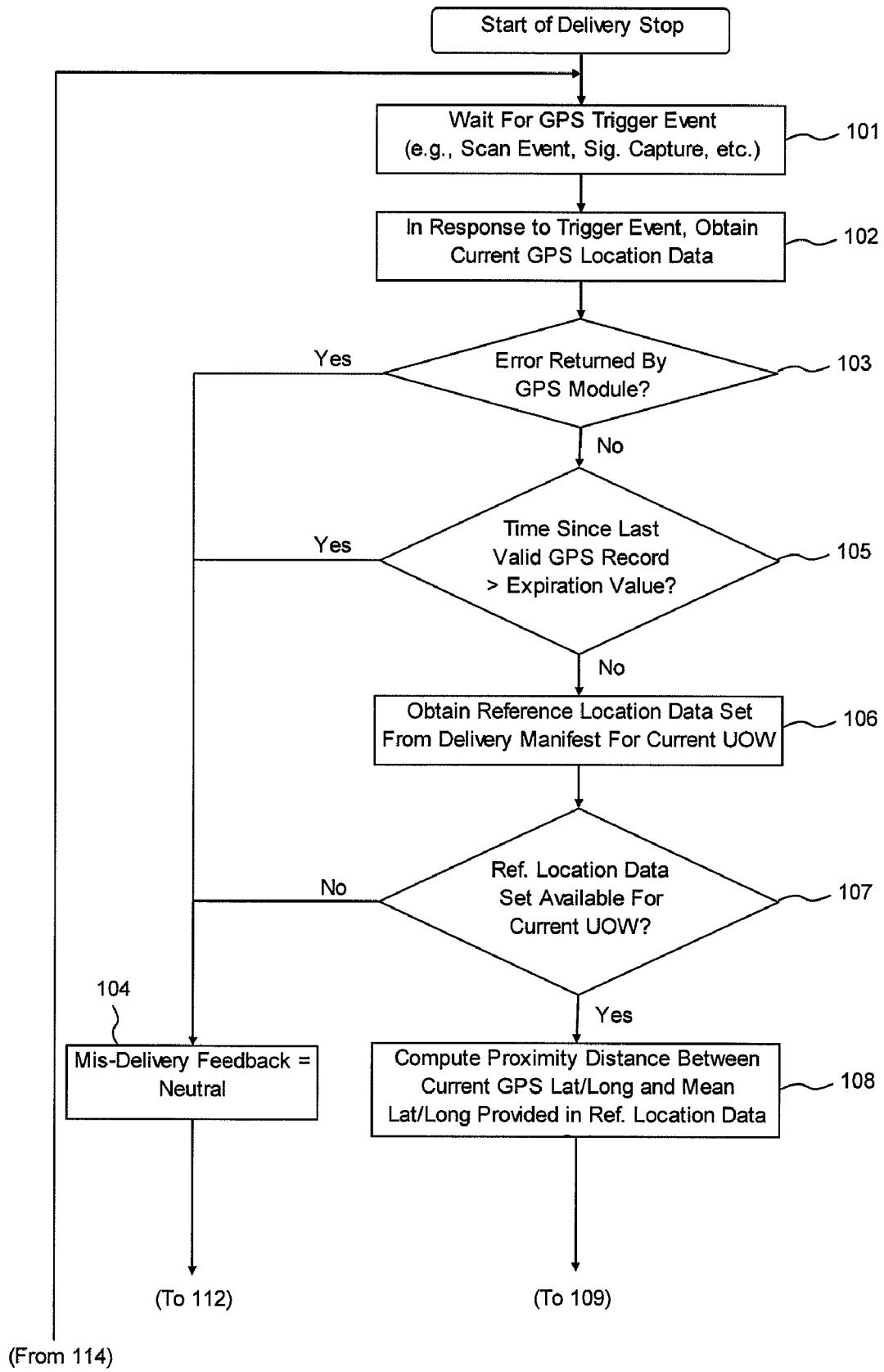
FIGS. 6A-6B show a process flow diagram that illustrates the steps for determining whether a potential mis-delivery may be occurring at a delivery stop in accordance with an embodiment of the present invention.
Figure 6B:
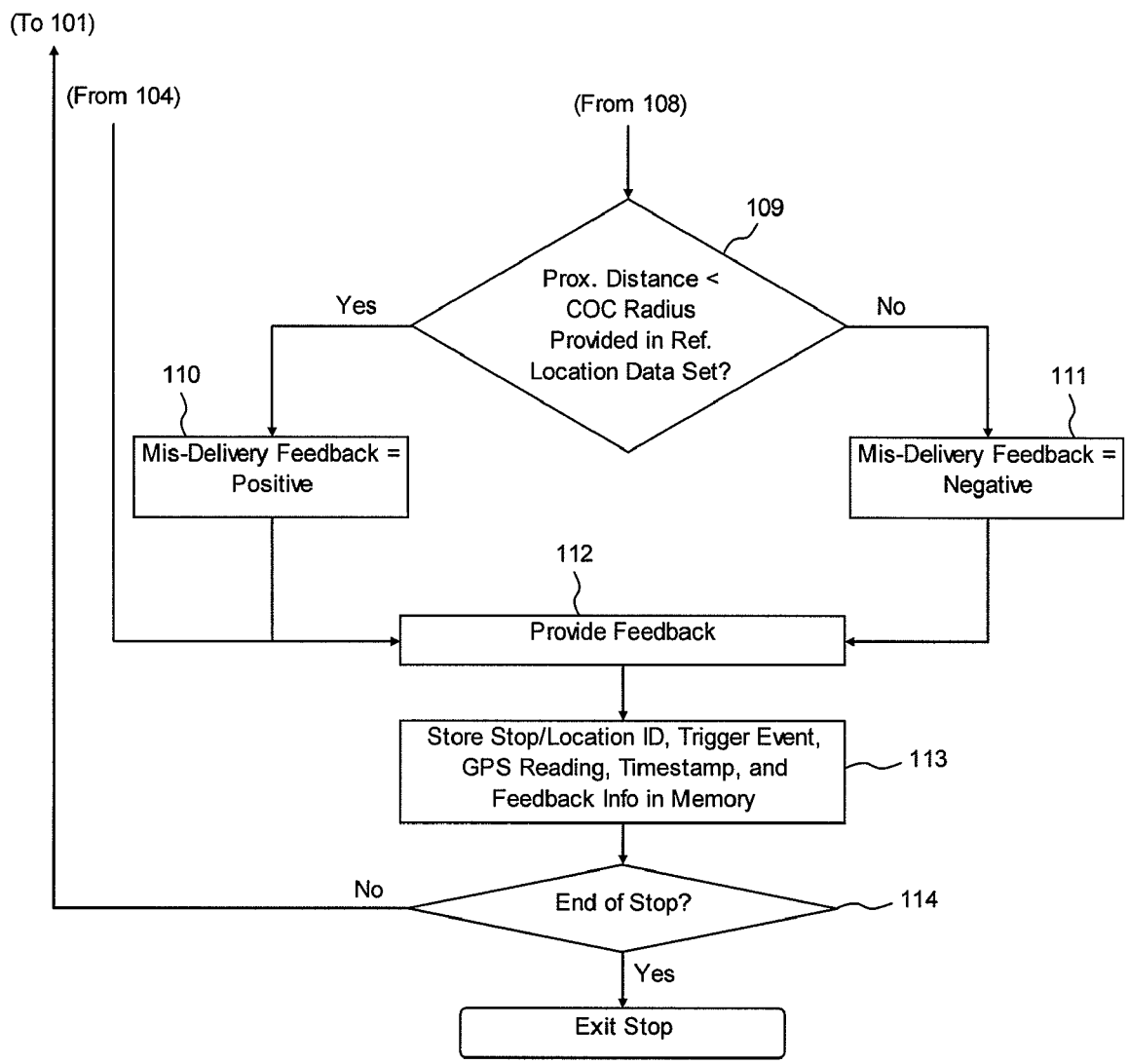

FIGS. 6A and 6B show a process flow diagram that illustrates the process that may occur at the portable computing device 30 or other device for determining whether a potential mis-delivery may be occurring at a delivery stop, in accordance with one embodiment of the present invention. The process begins at step 101, where the system (e.g., the mis-delivery application 42 running on the portable computing device 30) waits for the occurrence of a predefined GPS trigger event. Such predefined GPS trigger events may include, but are not limited to, the first label scan event for a stop, an electronic signature capture event, an input to the device 30 indicating that the driver has left a particular item at the current location (i.e., without capturing a signature), an input or event that indicates to the device that the current stop is now complete, or an input specifically instructing the device to capture a GPS reading. When a GPS trigger event does occur (e.g., the driver performs the first package scan of a stop), the process proceeds to step 102 where, in response to the trigger event, the system obtains the most recent GPS location data from the GPS module 36.

If the system determines, at step 103, that the GPS module 36 has returned an error (e.g., serial link down), the process advances to step 104 where the system sets the type of mis-delivery feedback to "neutral." Mis-delivery feedback generally includes any type of audio and/or visual indicator, or any other such indicator, that provides notification to the driver (or remote monitoring system 90) on whether a potential mis-delivery may be occurring. Neutral feedback generally implies that for one reason or another, the device 30 is not able to determine whether a potential mis-delivery may be occurring in connection with the current GPS trigger event. If an error is not returned by the GPS module 36, the process advances to step 105, where the system checks to see whether the most recent GPS data available was received recently enough to provide a valid estimate of the current location. Specifically, if the system determines that the time since the last valid GPS record exceeds a predefined expiration value (e.g., if last valid GPS record is more than 10 seconds old), the system may again set the type of mis-delivery feedback to neutral.

If, on the other hand, the last valid GPS record was received recently enough to provide a valid estimate of the current location (e.g., the time since the last valid GPS record is equal to or less than the predetermined expiration value), the process advances to step 106, where the system sets out to obtain the reference location data set 48 that is associated with the current UOW. As described above, in one embodiment, each reference location data set 48 includes a reference geocode (e.g., a reference longitude and latitude) and a radius value that defines a circle of confidence (COC) about the reference geocode, within which delivery of a related item is considered acceptable. As also described above, in a preferred embodiment, the portable device 30 receives such reference location data with the delivery manifest obtained from the route manager 25. As such, step 106 may involve the system accessing data stored in the memory of the portable device 30 to obtain the reference location data set 48 associated with the current UOW. In another embodiment, however, the portable device 30 may wirelessly access the delivery management system 20 in an attempt to obtain reference location data. In yet another embodiment, the portable device 30 may wirelessly communicate the GPS record to the delivery management system 20 and await mis-delivery feedback from the delivery management system 20. If the system determines, at step 107, that reference location data for the current UOW is not available, the system again sets the type of mis-delivery feedback to neutral.

However, if the appropriate reference location data is available, for example, in the reference location data set 48 stored in the memory 40 of the portable device 30, the process advances to step 108, where the system determines whether the current GPS reading is within the zone of confidence defined by the reference location data. In the illustrated exemplary embodiment, this step involves computing the proximity distance between the current GPS latitude and longitude reading and the reference latitude and longitude provided in the reference location data set. In one embodiment, the proximity distance computed at each GPS trigger point can be calculated as follows: Proximity Distance=(RadiusOfEarth)* a cos [cos(GPSLat)*cos(RefLat)*cos(GPSLong−RefLong)+ sin(GPSLat)*sin(RefLat)], where GPSLat is the latitude received from the current GPS reading, GPSLong is the longitude received from the current GPS reading, RefLat is the reference latitude provided in the reference location data set, RefLong is the reference longitude provided in the reference location data set, and RadiusOfEarth is approximately 6378 km or 3963 (statute) miles. Next, at step 109, in an embodiment where the zone of confidence is a circle, the system determines whether or not the calculated proximity distance is less than the circle of confidence radius provided in the reference location data set 48.

If the system determines that the GPS reading is within the reference zone of confidence (e.g., the calculated proximity distance is less that the radius of the circle of confidence), the process proceeds to step 110, where the system sets the type of mis-delivery feedback to "positive" so that positive mis-delivery feedback can be provided to the driver (or remote monitoring system 90). Alternatively, if the system determines that the GPS reading is outside the reference zone of confidence (e.g., the calculated proximity distance is greater than the radius of the circle of confidence), the process advances to step 111, where the system sets the type of mis-delivery feedback to "negative" so that negative mis-delivery feedback can be provided to the driver (or remote monitoring system 90).

Figure 8:
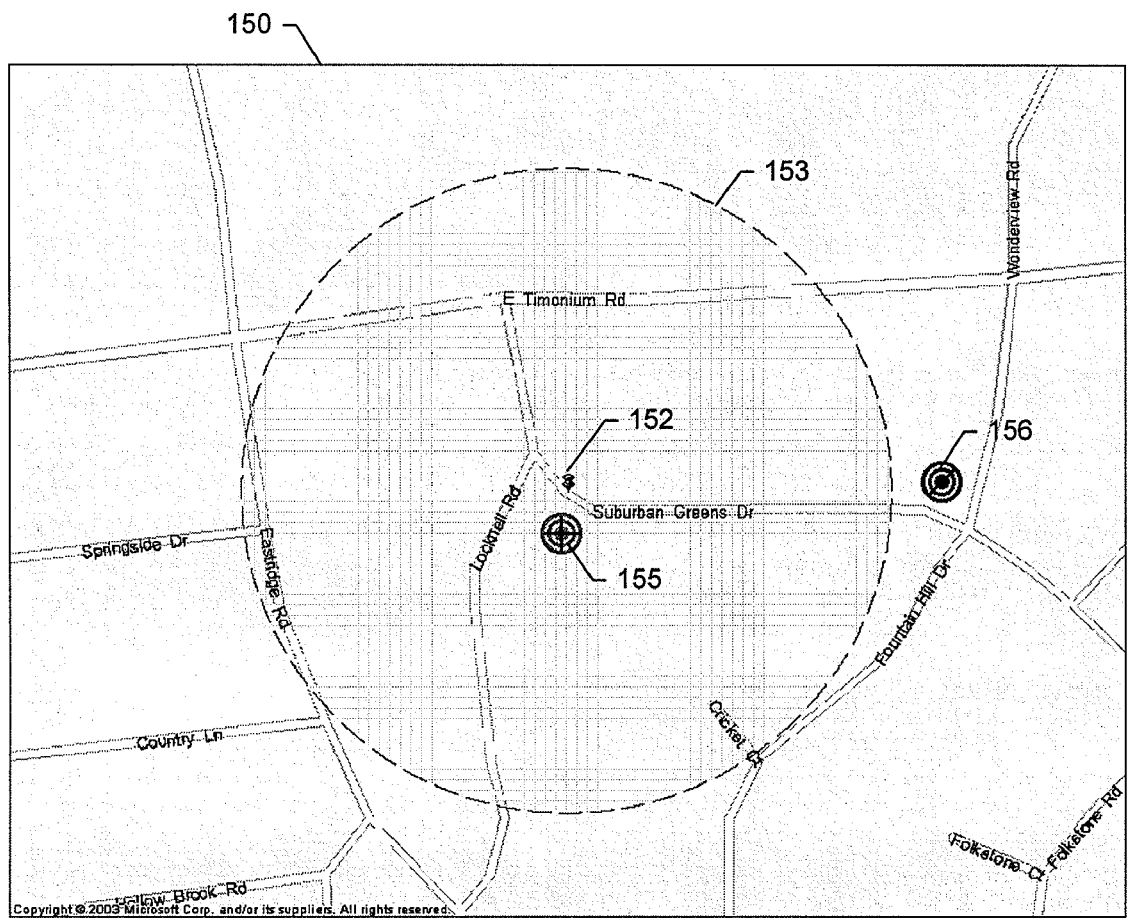
FIG. 8 illustrates an exemplary map-type display view that may be displayed on the portable computing device of FIG. 1 as feedback in accordance with an embodiment of the present invention.

At step 112, the system displays or issues the appropriate type of mis-delivery feedback to the driver (or remote monitoring system 90). In one embodiment, neutral feedback is provided to the driver by displaying an appropriate neutral visual indicator on the display of the portable device 30, positive feedback is provided by displaying an appropriate positive visual indicator, and negative feedback is provided by displaying an appropriate negative visual indicator and by issuing a corresponding audible tone. For example, FIG. 7 illustrates three exemplary display views that may be displayed on the portable device 30 in response to positive, neutral, and negative mis-delivery feedback events. Display view 130 illustrates a positive visual indicator that may include a positive icon 140. In the illustrated embodiment, the positive icon 140 is a green bull's eye symbol with cross hairs. Display view 131 illustrates a neutral visual indicator that may include a neutral icon 141. In the illustrated embodiment, the neutral icon 141 is a yellow bull's eye symbol. Display view 132 illustrates a negative visual indicator that may include a negative icon 142. In the illustrated embodiment, the negative icon 142 is a red bull's eye symbol with slash through it. In other embodiments, the portable device 30 may provide the driver with feedback in other ways in addition to or as an alternative to the icons 140, 141, and 142. For example, in one embodiment illustrated in FIG. 8, the portable device 30 may display a map 150 with visual indicators representing the reference geocode (e.g., the latitude and longitude reference point) 152, the zone of confidence 153, and visual indicators 155 and/or 156 for one or more of the GPS readings. In this way the driver may be able to see on the map 150 whether a current GPS reading is within the zone of confidence 153 and where the current GPS reading is with respect to the zone of confidence.

At step 113, the system stores all relevant data associated with the current GPS trigger event, including, but not limited to, location identifier (e.g., unique address or address code), type of GPS trigger event, GPS location reading (i.e., latitude and longitude), timestamp data, and information on the type of mis-delivery feedback that was issued (if any) in connection with the current GPS trigger event. If the system determines, at step 114, that the current stop has come to an end, mis-delivery processing for the current stop also comes to an end. However, if the system determines the stop has not ended, the process returns to step 101 where the system waits for the next GPS trigger event to occur. This data stored by the portable device 30 can, at some point, be uploaded to the portable device information repository 22, as illustrated in FIG. 4, and the GPS readings or other position information taken in response to certain predefined trigger events may be used as geocode samples that are used by the LDS 23 to generate or modify the reference location data for the associated point address.

C. Location Data Service

FIG. 9 illustrates a block diagram primarily of the location data service (LDS) 23 of FIG. 4. As described above, the LDS 23 receives geocode samples, such as GPS records, and other related geocode and/or delivery information from the portable device information repository 22 and uses the geocode samples and other information to generate a reference location data set (e.g., a reference geocode and a zone of confidence) for each unique point address.

Although many of the embodiments of the LDS 23 described herein are described with reference to the delivery management system 20, other embodiments of the LDS 23 and the systems and processes associated therewith may be used with other systems where it is advantageous to associate geocodes with point addresses. For example, although the LDS 23 is described herein as obtaining geocode samples from portable devices 30 used by drivers in a delivery/pickup service, other embodiments of the LDS 23 may receive geocode samples from other sources. Likewise, although the LDS 23 is described herein as communicating reference location data sets to portable devices 30 used by delivery drivers, other embodiments of the LDS 23 may provide reference location data (e.g., reference geocodes) and related metrics to other entities, such as a mapping service. In this regard, the ability to link delivery route information and delivery addresses with geocode information captured by a GPS sensor 310 during the delivery thus allows for the creation of a data standard that is an improvement over census and zip code+4 data alone. The benefits of this are far greater than just preventing mis-deliveries. While one use of such data is to enhance the accuracy of customer data in the package delivery industry, this data has value outside the parcel delivery and pickup industry that will be readily apparent to one of ordinary skill in the art. For example, the LDS 23 and some or all of the other systems described herein can be used to create a more accurate database of addresses and associated geocodes that can be used in many applications, such as, for example, to direct emergency response personnel to a particular address.

Referring to FIG. 9, in the illustrated embodiment, the LDS 23 has two main systems of execution: a job control system 200, and a message handler system 210. The job control system 200 controls the receipt of portable device information (e.g., GPS records, delivery information, etc.) and the conversion of this information into a reference geocode and related metrics for each unique point address. The message handler system 210 handles incoming messages, such as requests for the reference location data (e.g., the reference geocodes) associated with certain point addresses.

The job control system 200 performs work based on jobs outlined in the job tables 230. The job control system 200 performs work by calling various modules of the LDS 23. In this regard, the LDS 23 includes a repository subscription module 208 that is configured to communicate with the portable device information repository 22 and receive data stored in the portable device information repository 22. As described above, the portable device information repository 22 includes information received from one or more of the portable devices 30. Such information may include unique location identifiers (e.g., unique addresses and/or address codes) and associated geocode samples (e.g., GPS records), as well as related geocode and/or delivery information (e.g., an indication of the trigger event that prompted each geocode sample to be recorded, timestamp data, the age or the "accuracy" of each geocode sample, etc.). The repository subscription module 208 may be communicatively coupled to the portable device information repository 22 via a wired or a wireless connection, which may include a local, wide, or global area network (e.g., the Internet).

In one embodiment, the repository subscription module 208 uses File Transfer Protocol (FTP) to connect to and receive data from the information repository 22. For example, the repository subscription module 208 may be configured to periodically check the FTP directory of the portable device information repository 22 for the latest set of portable device information export files that have not been processed by the LDS 23. If the repository subscription module 208 finds new export files in the portable device information repository 22, the repository subscription module 208 may then use FTP to pull the export files from the portable device information repository 22 server and download the data to a local directory or data file system 220.

The data received from the information repository 22 may be in a compressed form or in a specific format that is not preferred by various components of the LDS 23. As such, the repository subscription module 208 may decompress (e.g., "unzip") or otherwise reformat the data before storing the data in the LDS's repository data file system 220. In one embodiment, the repository information is stored in the file system 220 as a delimited text file, such as a Comma Separated Values (CSV) file type.

After the repository subscription module 208 receives new data files from the portable device information repository 22, the repository subscription module 208 may then create a new job in the job tables 230 that will call up other modules of the job control system 200 of the LDS 23 in order to process the new data stored in the data file system 220. In this regard, the LDS 23 further includes a get-repository-data module 202. The get-repository-data module 202 is configured to obtain the data from the file system 220, such as by parsing the delimited text files, and importing the data into one or more portable device information history tables 222.

In one embodiment, the get-repository-data module 202 imports the portable device information data into four tables: an address table, a stop table, a packages table, and a geocode trigger table. The address table includes a record of each unique address that is processed by the LDS 23. The address table may also include a unique key or a "point ID" for each unique address. The point ID is a unique shorthand representation of a unique point address used by the LDS 23 and/or the delivery management system 10 to identify the unique point address. In one embodiment, the point ID is a 16 byte number generated by the LDS 23 by taking primary elements of the address (e.g., street number, name, city, postal code, and/or country) and running them through an algorithm, such as an MD5 hash algorithm. Although much of the data in the portable device information history tables 222, such as the stop, packages, and trigger tables, may be considered a temporary or "working set" of data that gets processed by the system and is then deleted, in one embodiment, the data in the address tables (e.g., the unique addresses and the associated point IDs) is not deleted.

For each unique address stored in the address table, at least one stop record is created in the stop table. Each stop record includes information about a delivery or a pickup stop made to the associated unique address. For each stop record stored in the stop table, at least one package record is created in the packages table. Each package record includes information about an item being delivered or picked up at the associated address during the associated stop. The item information may include information about the item and/or about whether the item was successfully delivered or picked up. For each package record stored in the packages table, at least one geocode trigger record is created in the geocode trigger table. Each geocode trigger record includes information about a geocode trigger event that occurred at the associated address during the associated stop for the associated item or package. The geocode trigger event information may include such information as a GPS reading (e.g., latitude and longitude information) recorded in response to the trigger event, the type of trigger event, timestamp information about when the trigger event occurred, information about when the GPS reading was taken relative to the trigger event, any feedback information, etc.

The LDS 23 further includes a business logic module 204. The business logic module 204 is generally configured to receive the portable device information history tables 222, filter and process the data stored therein by applying various business-related logic to the data, and generate weighted geocode sample data 224. The weighted geocode sample data 224 includes the geocode sample records after they are processed by the business logic module 204. The weighted geocode sample data 224 therefore includes a record of one or more geocode samples for each unique point address that has been processed by the LDS 23. In one embodiment, the business logic module 204 creates one weighted geocode sample for each eligible delivery (or pickup) stop. In other embodiments, the business logic module 204 may create a plurality of weighted geocode samples for each stop, such as one weighted geocode sample for each of a plurality of eligible trigger events that occurred at each eligible stop.

More specifically, in one embodiment, the business logic module 204 may be configured to select which stops may be suitable to use in the generation of reference location data. For example, the package tables may include one or more package status codes for each package. The package status codes may include codes that indicate that the delivery or pickup of the package was unsuccessful. If the package status codes for all of the packages at a stop have, for example, an "unsuccessful" status code associated therewith, then the business logic module 204 may be configured to ignore the stop completely.

Similarly, in one embodiment, the business logic module 204 may be configured to select which trigger events may be suitable to use in generating reference location data and/or how much to weight each geocode sample recorded during the trigger events. For example, the business logic module 204 may be configured to ignore or weight geocode samples based on the type of trigger event (e.g., a GPS reading captured at the time that the consignee signed for a package may be considered to be a more reliable of a geocode sample than a GPS reading captured at the time that the delivery driver scanned the package in the truck) and/or the "age" of the geocode at the time it was recorded (e.g., a GPS reading taken at the time of the trigger event may be considered more reliable than a GPS reading that was actually taken thirty seconds before the trigger event). In some embodiments, once the business logic module 204 finishes processing the portable device information history data 222, the business logic module 204 may be configured to delete the data 222 other than the address and point ID data. FIG. 13, described below, provides a more detailed description of the process executed by the business logic module 204 in accordance with an embodiment of the present invention.

The LDS 23 further includes an "Operations Research" (OR) algorithm module 206. The OR algorithm module 206 is generally configured to read the weighted geocode sample data generated by the business logic module 204 and generate reference location data (e.g., reference geocodes and/or zones of confidence) therefrom. The OR algorithm module 206 may also be configured to perform other tasks such as deleting excess geocode samples in the weighted geocode sample data if the geocode samples associated with a particular point address are greater than some predefined maximum number.

In general, the OR algorithm module 206 is configured to create a single reference location data set for each unique point address by applying statistical algorithms to the collection of weighted geocode samples associated with each unique point address. For example, the OR algorithm module 206 may run an averaging calculation and one or more nearest neighbor-type calculations or other algorithms on the collection of geocode samples for a given point address in order to eliminate outlier records and determine a mean geocode (e.g., a mean latitude and longitude) to use as the reference geocode. The OR algorithm module 206 may also be configured to generate zone of confidence parameters, such as a circle of confidence radius, for each point address. The zone of confidence may be based on, for example, a predetermined value or may be based on results of the nearest neighbor algorithm or other algorithm. The reference location data set (e.g., a reference geocode and/or zone of confidence parameters) generated by the OR algorithm module 206 for each unique point address may then be stored in the reference location data set repository 226.

In one embodiment, the OR algorithm module 206 is also configured to "clean-up" or delete excess geocode samples stored in the weighted geocode sample repository 224. For example, the number of geocode samples per unique address may be capped at a certain maximum number such that the system does not get bogged down with too many samples. For example, where new weighted geocode samples generated by the business logic module 204 cause the number of geocode samples stored in the weighted geocode samples repository 224 for a particular point address to be greater than a predetermined maximum number of geocode samples allowable for each point address, then the OR algorithm module 206 may be configured to delete one or more of the geocode samples in the repository 224 to bring the total number of geocode samples for the particular address below the maximum allowable number of geocode samples. In one embodiment, the OR algorithm module 206 deletes geocode samples based on the relative ages of the samples and/or the relative weights of the samples (e.g., older records and records with lower weights may be considered less reliable than newer records and records of with greater weights). FIG. 14, described below, provides a more detailed description of the process executed by the OR algorithm module 206 in accordance with an embodiment of the present invention.

Figure 10:
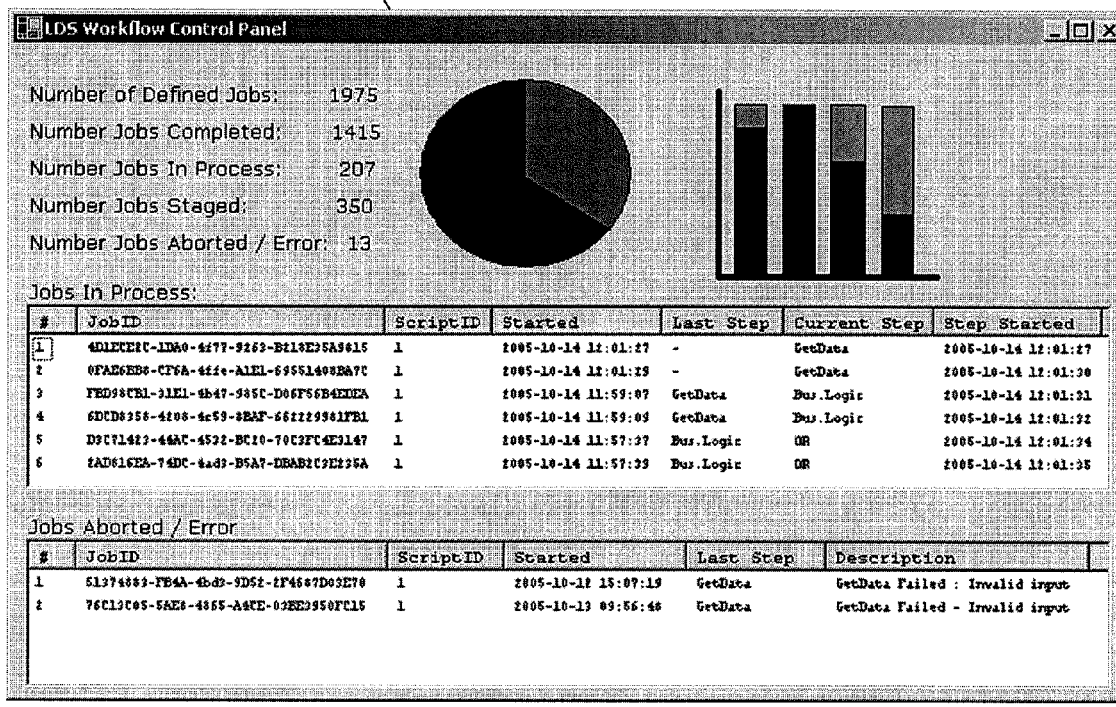
FIG. 10 illustrates an exemplary graphical user interface of the location data service control panel of FIG. 9 in accordance with an embodiment of the present invention.

The delivery management system 10 may also include a LDS control panel 232. The LDS control panel 232 may provide a system administrator or other user with access to the LDS 23 and may allow the user to edit existing jobs stored in the job tables 230 of the LDS 23 or to specify new jobs for the LDS 23 to perform. As the job control system 200 of the LDS 23 performs various jobs, the job control system 200 may update the status of each job in the job tables 230. In this way, the LDS control panel 232 can be used to monitor the progress of one or more jobs being performed by the LDS 23. In this regard, FIG. 10 illustrates an exemplary graphical user interface 233 of the LDS control panel 232, in accordance with one embodiment of the present invention.

In addition to the job control system 200 described above, the LDS 23 further includes a message handler system 210 configured to handle incoming messages, such as requests for some or all of the reference location data sets 226 generated by the job control system 200. In this regard, the message handler system 210 may include a route manger subscription module 212 for communicating reference location data sets (e.g., reference geocodes and/or zone of confidence information) to the route manager 25 or to some other remote system.

For example, in one embodiment, the route manager subscription module 212 receives a request from a remote route manager 25 associated with a particular delivery distribution center. The request from the route manager 25 may include information about the last time the route manager 25 was updated with reference location data from the LDS 23. In response, the route manager subscription module 212 may access the reference location data set repository 226 and communicate the reference location data sets that have changed since the last time the route manager 25 was updated. In other instances, the route manager subscription module 212 may be configured to deliver all of the reference location data sets stored in the repository 226 to the route manager 25 or other remote entity. In still other instances, the route manager subscription module 212 may be configured to receive a request for reference location data for one or more specific point address, to which the route manager subscription module 212 may respond only with the reference location data sets associated with the one or more requested point addresses. In one embodiment, the route manager subscription module 212 uses Extensible Markup Language (XML) to communicate reference location data to the route manger 25 and/or to other remote entities. In this regard, the route manager subscription module 212 may further be configured to compress or encode the reference location data prior to communicating it to the route manager 25 or other entity over a communication network.

The location data service 23 may be comprised of a single server or multiple servers. Where the LDS 23 is comprised of multiple servers, the multiple LDS servers may be identical or may be configured to process different information. For example, in one embodiment, multiple identical LDS servers may be provided that use a round robin load balancer that distributes jobs and data requests to the various LDS servers in order to distribute the work load amongst the multiple servers in a substantially even manner. In another exemplary embodiment, each of a plurality of LDS servers are configured only to handle location data received from certain predefined sources, such as from a predefined group of delivery distribution centers. In such an embodiment, each LDS server is aware of which LDS server handles which distribution centers so that if a first LDS server receives a data request for location data handled by a different LDS server, the first LDS server can forward the data request to the appropriate LDS server. Of course other server arrangements may be used to perform the functions of the LDS 23, as will be obvious to those skilled in the art in view of this disclosure.

Figure 11:
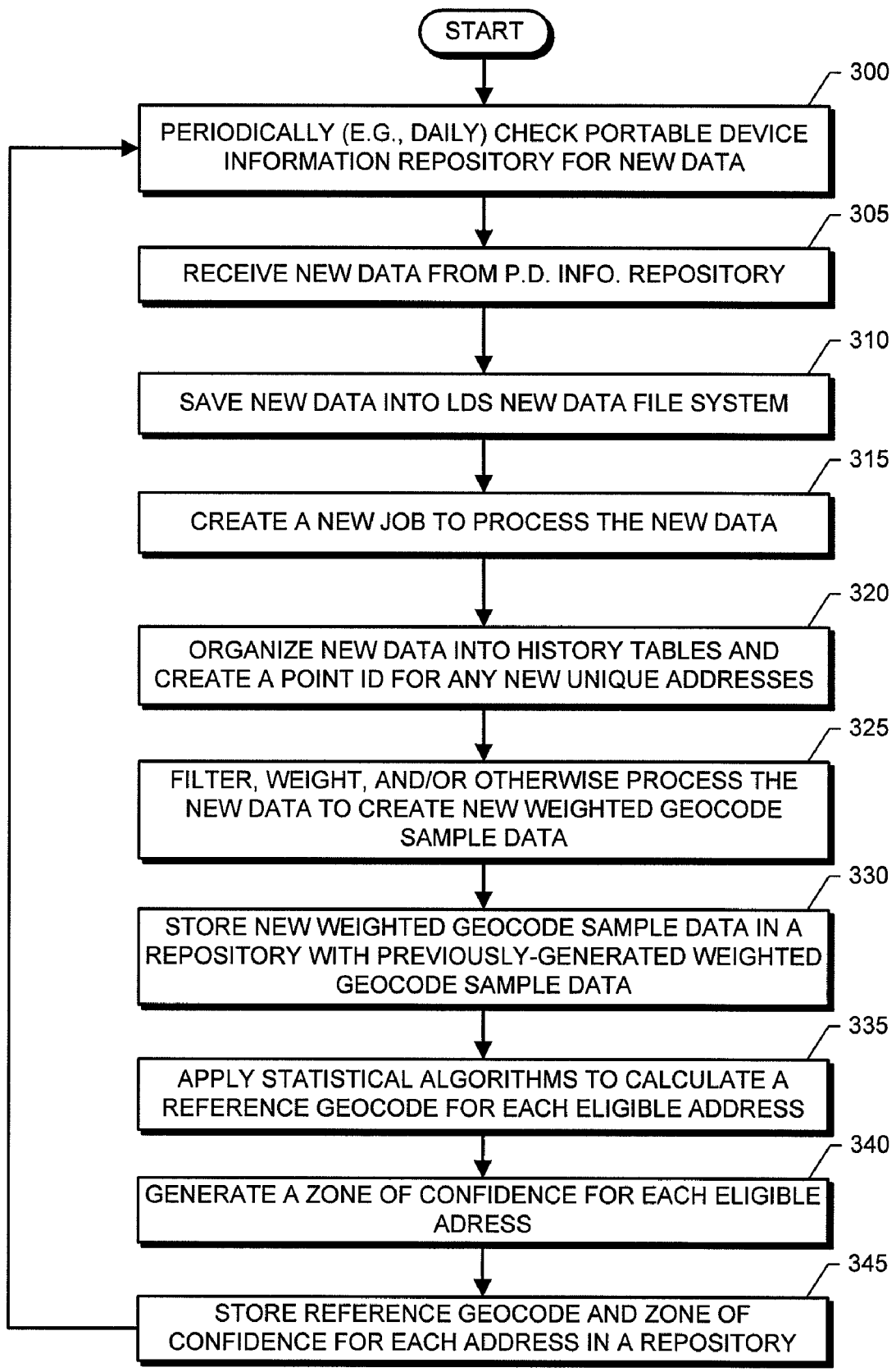
FIG. 11 shows a process flow diagram that illustrates the process of using geocode samples to generate reference location data sets in accordance with an embodiment of the present invention.

FIG. 11 provides a flow chart that illustrates the process of receiving geocode samples and generating reference location data sets for each of a plurality of point address, in accordance with one embodiment of the present invention. As described above, such a process may be performed by the LDS 23, and, in particular, by the job control system 200 of the LDS 23. At step 300, the LDS 23 may periodically (e.g., daily) check the portable device information repository 22 for new data, such as new geocode samples and/or delivery data received from a portable delivery device 30. As described above, the LDS 23 may comprise a repository subscription module 208 to perform the task of checking the repository 22 for new data that may be useful in the generation of reference location data sets, where the "new data" is data that has been added to or data that has been modified in the repository 22 since the last time the subscription module 208 checked and/or received data from the repository 22.

At step 305, the LDS 23 receives new data from the portable device information repository 22 and then, at step 310, saves the new data into a local file system or data repository. For example, as described above, the repository subscription module 208 of the LDS 23 may save the new data into a repository data file system 220 and, in doing so, decompress, encode, and/or decode the data into a predefined data or file format. At step 315, the LDS's repository subscription module 208 may then create a new job in the job tables 230 that informs the LDS 23 of the new data that the LDS's job control system 200 needs to further process.

At step 320, the LDS 23 may take the new data stored in LDS file system 220 and organize the new data into one or more portable device information history tables 222. As described above, the LDS 23 may use the get-repository data module 202 to get the data from the file system 220 and organize it into a plurality of tables, such as an address table, a stop table, a packages table, and a geocode trigger table. At step 320, the LDS 23 may also create a unique point ID for each unique point address that it receives in the data. In one embodiment, the get-repository-data module 202, when creating an address table, creates the unique point ID for each new unique address it receives by using a predefined algorithm, such as an M5 hash algorithm.

At step 325, the LDS 23 filters, weights, and/or otherwise processes the history tables 222, which contain the new data, in order to create new weighted geocode samples for the weighted geocode sample data repository 224. In general, step 325 involves reading each geocode sample (e.g., GPS record) in the new data and any associated contextual information about the geocode sample and then determining how useful each geocode sample may be in accurately identifying the true location (e.g., the true latitude and longitude) of the associated point address. Each geocode sample may then be weighted based on its determined usefulness relative to other geocode samples. For example, manually entered data generated by the delivery driver may be considered to be often inaccurate compared to data automatically generated by the delivery management system 20 or the portable computing device 30. As such, in one embodiment, manually entered data may be weighted zero and effectively ignored when calculating the reference location data. In another example, a GPS record may be weighted highly where the GPS reading was recorded by a portable device 30 at the same time that a consignee is signing for a package. Such weighting rules may be externally configurable and may correspond to such attributes of the stop and the geocode reading as stop type, trigger type, time since the last stop, age of the GPS reading, etc. As described above, the LDS 23 may use the business logic module 204 to apply such filtering and/or weighting rules to the new data received. FIG. 13, described below, provides a more detailed description of the process executed by the business logic module 204 in accordance with an embodiment of the present invention.

At step 330, the LDS 23 stores the new weighted geocode sample data in a weighted geocode sample data repository 224 updating or adding any previously-generated geocode sample data already stored therein.

At step 335, the LDS 23 uses the geocode sample data stored in the weighted geocode sample data repository 224 to calculate a reference geocode for each eligible point address. To do so, the LDS 23 may use one or more statistical algorithms to generate a single reference geocode (e.g., a reference longitude and latitude) for each eligible point address from the plurality of different geocode samples that may be associated with a point address. For example, the LDS 23 may apply an averaging algorithm to calculate a mean latitude and a mean longitude from the plurality of sample latitude and longitude records that may be associated with a point address. The averaging algorithm may be a weighted averaging algorithm that uses the weights assigned to the geocode samples in step 325 when calculating the mean location data.

In some embodiments, the LDS 23 uses one or more nearest neighbor algorithms to ignore outlying geocode samples during the calculation of a reference geocode. In some embodiments, a point address is considered eligible for having a reference location data calculated if the point address has more than a predefined number of weighted geocode samples associated with it that have a non-zero weight. As described above, the LDS 23 may use the OR algorithm module 206 to perform such statistical calculations and create reference geocodes for each eligible point address. FIG. 14, described below, provides a more detailed description of the process executed by the OR algorithm module 206 in accordance with an embodiment of the present invention.

At step 340, the LDS 23 may use the reference geocode generated in step 335 along with various statistical algorithms to generate a zone of confidence for each eligible point address. As described above, the zone of confidence is an area about the reference geocode in which a current GPS reading is assumed to be acceptably close to the reference geocode. The zone of confidence recognizes the inaccuracies that may be inherent in the process, such as in the GPS readings, the generation of geocode samples, and the generation of reference geocodes. The zone of confidence can also be tailored to the particular application for which the reference geocodes are to be used. In some embodiments the zone of confidence may be the same for all point addresses, while in other embodiments, the zone of confidence may be tailored to the particular point address (e.g., a large shopping center having only a single point address associated with it may have a larger zone of confidence that a residential address in a tightly laid-out neighborhood) and/or to the variance in the non-zero weighted geocode samples or the mean distance of the non-zero weighted geocode samples from the calculated reference location. In one embodiment, the zone of confidence includes a circle of confidence and the statistical algorithms are used to determine an appropriate radius of the circle of confidence associated with each point address. As described above, in one embodiment, the LDS 23 uses the OR algorithm module 206 to create a zone of confidence for each eligible point address. FIG. 14, described below, provides a more detailed description of the process executed by the OR algorithm module 206 in accordance with an embodiment of the present invention.

At step 345, the LDS 23 stores the reference location data set (e.g., the reference geocode and the associated zone of confidence) for each address in the reference location data set repository 226. The LDS 23 repeats the steps 300-345 continuously or periodically in order to continuously process new geocode data and/or associated delivery data collected by portable devices 30 or other sources.

FIG. 12 provides a flow chart that illustrates the process of providing reference location data to remote requesting entities, in accordance with one embodiment of the present invention. As described above, such a process may be performed by the LDS 23, and, in particular, by the message handler system 210 of the LDS 23. At step 350, the LDS 23 may receive a request for reference location data. For example, in one embodiment, a subscription module of the LDS 23 receives a request that includes the date and time of the requesting entity's last update received from the LDS 23. In response to such a request, at step 355, the subscription module may access the reference location data repository 226 and, at step 360, communicate to the requesting entity any reference location data sets that have been added or modified since the date and time of the last update of the requesting entity. In other embodiments, the subscription module may receive requests in the form of specific point addresses for which the requesting entity wants reference location data. In still other embodiments, requests to the LDS 23 may be made in other ways, as will be apparent to those skilled in the art in view of the present disclosure.

In one embodiment, the requesting entity is a route manager 25 of a delivery service. In general, the route manager 25 generates the delivery manifests that are downloaded to the portable devices 30. A delivery service may have many route managers 25, each route manager servicing one or more delivery distribution centers, and each distribution center servicing a particular geographic region. Where the requesting entity is one of a plurality of route managers, the route manager subscription module 212 of the LDS 23 may be configured to recognize the particular route manager 25 and only communicate new or modified reference data sets that pertain to locations serviced by the route manager 25 (e.g., locations serviced by the distribution centers that the route manager services). Thus, in some embodiments, the LDS 23 recognizes a requesting entity and only communicates new or modified reference data that pertains to addresses serviced by the requesting entity.

FIGS. 13A and 13B provide a flow chart that illustrates the process of applying predefined business logic rules to the portable device information and using such rules to filter and/or weight the geocode samples, in accordance with one embodiment of the present invention. In general, the business logic rules are rules that determine the usefulness of each record as a geocode sample for use in computing reference location data. The business logic rules determine usefulness by making assumptions about the accuracy of the geocode samples based on such information as the age of the geocode sample, the trigger event that prompted recording of the sample, the type of location associated with the point address, the age of the geocode reading (e.g., the GPS reading) at the time that the geocode reading was recorded by the trigger event, whether the delivery or pickup stop associated with the geocode sample was deemed to be a successful delivery or pickup stop, and other information related to the delivery or pickup and/or the geocode reading.

For example, in the embodiment illustrated by FIGS. 13A and 13B, at step 400, the business logic module 204 receives portable device information history data and considers the data related to a particular unique point address. For each point address, the data may contain information for one or more delivery or pickup stops made to the address. As such, at step 404, the business logic module 204 selects a stop record associated with the particular point address. Each stop record may have a plurality of package records associated therewith, for example, if a plurality of items were delivered and/or picked up to or from the point address.

The portable device information history data may include one or more status codes associated with each package record. The status codes may be used by the delivery service to indicate information about the status of the delivery or pickup of the particular package or item. Some status codes may be designated by the LDS 23 to be "ignore codes" that indicate records that may produce unreliable geocode samples and therefore should be ignored. For example, certain status codes may indicate that the pickup or delivery of the package or other item was deemed unsuccessful since the address was incorrect or for some other reason. In some embodiments, even if the delivery or pickup was deemed successful, records may be ignored for other factors that may have a higher than acceptable probability of leading to an inaccurate geocode sample. For example, in one embodiment, samples that include manually entered address data may be ignored or, in another embodiment, all pickup records may be ignored. At step 410, if all of the package records for a particular stop have ignore codes associated with them, then the business logic module 204 ignores the stop record completely and proceeds to step 460 where the business logic module 204 moves on to consider any other stop records associated with the particular point address.

It should be noted that, where the business logic module 204 "ignores" a particular record, it may not store the one ore more geocode samples associated with the record in the weighted geocode sample repository 224, or it may store the one or more geocode samples in the repository with a weight of zero. If, however, at step 410, at least one package record for a particular stop does not have an ignore code associated with it, then the business logic module 204 proceeds to step 415 where the business logic module 204 selects a trigger event record from the plurality of trigger event records that may be associated with the stop record.

As described above, in one embodiment, the LDS 23 may filter or weight geocode samples based on the "age" of the geocode reading (e.g., the GPS reading) at the time that the reading was recorded in response to the trigger event. For example, in accordance with one embodiment, each trigger event record includes a timestamp indicating the time at which the GPS reading was taken and a timestamp indicating the time when the trigger event occurred (i.e, the time that the GPS reading was recorded in association with the trigger event). Although a GPS reading is preferably taken simultaneously with the trigger event, in some instances the portable device may be unable to receive a GPS signal at all times. As such, the portable device may be configured to periodically capture GPS readings and associate the last captured GPS reading with the trigger event if a current GPS reading is unavailable.

Therefore, in one embodiment, at step 420, the business logic module 204 considers whether the GPS reading was captured at the same time that the associated trigger event occurred. If the GPS reading was captured at the same time that the trigger event occurred, then the business logic module 204 proceeds to step 425 where the module 204 designates the GPS record as type "A" record. If the GPS reading was not captured at the same time that the trigger event occurred, the business logic module 204 proceeds to step 430, where the business logic module 204 considers whether the GPS reading was captured within a predefined time of the trigger event. If the GPS reading was captured within the predefined time of the trigger event, then the business logic module 204 proceeds to step 435 where it assigns type "near A" to the GPS record. If, however, the GPS reading was not captured within the predefined time of the trigger event, then the business logic module 204 proceeds to step 440 where it assigns type "V" to the GPS record. At step 450, the business logic module 204 then weights the geocode sample associated with the trigger event based on the type of GPS record (e.g., "A," "near A," or "V"). For example, in one embodiment, the business logic module 204 is configured to weight a geocode samples having a type "A" geocode record higher than a geocode sample having a type "near-A" geocode record, and is configured to weight a geocode sample having a type "near-A" geocode record higher than a geocode sample having a type "V" geocode record.

Although FIGS. 13A and 13B illustrate an embodiment of the invention where the type of geocode reading (e.g., GPS reading) is determined by the business logic module 204 using timestamp information received from the portable device 30, in other embodiments, the type of geocode reading may be determined by other entities and the type of geocode reading may be included in the trigger event data table used by the business logic module 204 to weight the geocode samples. For example, the portable device 30 may be configured to assign a type indicator to each GPS record based on the age of the GPS reading at the time of the trigger event. Such a type indicator may then be associated with the GPS record and communicated to the business logic module 204 for use in filtering and/or weighting the geocode samples.

At step 450, the business logic module 204 may also be configured to weight the geocode sample based on the type of trigger event that prompted the recording of the geocode sample. As described above, in an exemplary embodiment, a geocode sample is recorded by a portable computing device 30 during the delivery of an item in response to certain predefined trigger events. For example, the trigger events may include: (1) the first package scan event for a stop; (2) an electronic signature capture event (e.g., the signature of a consignee); (3) an input to the device indicating that the driver has left a particular package at the current location (e.g., without capturing a signature); and (4) an input or event that indicates to the device that the current stop is now complete. In one embodiment, a geocode sample captured in response to a signature capture event is weighted higher than a geocode sample captured in response to the other events since a geocode reading, such as a GPS reading, captured when a consignee is signing for an item is more likely to be captured at a location correctly associated with the delivery address. In other embodiments, where geocode samples may be received from other sources, the business logic module 204 may be configured to weight the geocode samples based on the source that provides the geocode sample.

At step 455, the business logic module 204 considers whether there are other trigger event records associated with the stop record. If there are other trigger event records, the business logic module 204 returns to step 415 and weights or otherwise processes the geocode samples associated with the next trigger event record, as described above. If there are no more trigger event records associated with the stop record, the business logic module 204 proceeds to step 460 to determine whether there are other stop records associated with the current point address. If there are other stop records, the business logic module 204 returns to step 405 and processes the next stop record as described above. If there are no other stop records associated with the current point address, the business logic module 204 proceeds to step 465 and stores the weighted geocode samples (e.g., weighted GPS latitude and longitude data) in the weighted geocode sample repository 224. The business logic module 204 may also be configured to, at step 470, delete the portable device information history data stored in the repository 222 (although, as described above, the address table may be retained). The business logic module 204 may then return to step 400 to process the next unique point address that has new portable device information history data associated therewith.

The above described business logic rules used to weight the geocode samples are examples of predefined rules that may be used to determine how useful a specific geocode sample may be in approximating the correct location of a particular point address. Other business logic rules may be used in addition to or as an alternative to the above described rules, as will be apparent to a person skilled in the art in view of this disclosure. In general, the business logic rules will have a large impact on the quality of the final reference location data. As such, the business logic rules and the weighting factors applied by the rules are generally configured to be easily modifiable and externally configurable. Table 1 shows an exemplary embodiment of a configuration table used to turn exemplary business logic rules on and off and to set the weighting factors used by some of the business logic rules to weight the various geocode samples.

TABLE 1

| Component | Section | Config Entry | Default value | Range |
|---|---|---|---|---|
| Business Logic | Process | DeleteDeviceHistoryRecords | TRUE(1) | 0, 1 |
| | | DeleteLoadFiles | TRUE(1) | 0, 1 |
| | Sample Selection | IgnoreManAG | TRUE(1) | 0, 1 |
| | | MaxTimeSinceLastA | 300 | 0-32767 |
| | | StatusCodeToIgnoreList | CW, BI, G3, L1, AY, FO, AZ, KF, S6, 45, C4, KL, D9, C5, KG, MF, E4, KM, C6, A7, A8, A9, AA, 95, C7, AQ, AB, DI, 51, KZ, 52, AC, AE, AD, AF, FZ, CI, 48, KX, 49, KC, KV, C8, 46, 47, C9, CA, CU, CV, KI, ZZ, HM, G6, KK, E2, B1, AS, AR, UA, KJ, AX, F6, DJ, S7, KN | |
| | Sample Weighting | NearATimeSinceLastA | 15 | 0-32767 |
| | | Weights-DriverRelease | 60, 30, 2 | |
| | | 'A' record weight | 60 | 0-255 |
| | | 'Near-A' record weight | 30 | 0-255 |
| | | 'V' record weight | 2 | 0-255 |
| | | Weights-PScan | 30, 20, 1 | |
| | | 'A' record weight | 30 | 0-255 |
| | | 'Near-A' record weight | 20 | 0-255 |
| | | 'V' record weight | 1 | 0-255 |
| | | Weights-Signature | 240, 120, 6 | |
| | | 'A' record weight | 240 | 0-255 |
| | | 'Near-A' record weight | 120 | 0-255 |
| | | 'V' record weight | 6 | 0-255 |
| | | Weights-StopComplete | 30, 20, 1 | |
| | | 'A' record weight | 30 | 0-255 |
| | | 'Near-A' record weight | 20 | 0-255 |
| | | 'V' record weight | 1 | 0-255 |

Referring to Table 1, the DeleteDeviceHistoryRecords entry can be either true or false and instructs the system as to whether the portable device information history records 222 should be deleted once they have been used to create weighted geocode samples stored in the weighted geocode sample repository 224. The DeleteLoadFiles entry can be either true or false and instructs the system as to whether the temporary load files should be deleted. The IgnoreManAG entry can be either true (on) or false (off) and instructs the system as to whether trigger records having addresses that were entered manually should be ignored. This business logic rule may help reduce erroneous addresses in the LDS's databases.

The MaxTimeSinceLastA is used in determining the type of geocode record based on the age of the geocode reading at the time that it was recorded as a geocode sample. As described above with respect to FIGS. 13A and 13B, an "A" geocode record is one in which the geocode reading was a current reading at the time it was recorded by the portable device 30 (e.g., time of the geocode reading is the same time as the time of the trigger event that prompted the recording of the geocode reading as a geocode sample). All other geocode readings are either type "near-A" or type "V" and are associated with a TimeSinceLastA value. The TimeSinceLastA value indicates the amount of time since the "near-A" or "V" type readings were current readings (e.g., the "age" of the readings at the time that the readings were recorded as geocode samples). If the TimeSinceLastA value for a geocode record is greater than or equal to the MaxTimeSinceLastA value, then the geocode record is ignored (e.g., provided zero weight). This configuration entry may improve the accuracy of the reference location data by ignoring geocode samples where the geocode reading (e.g., the GPS reading) was taken far back in time (and presumably distance) before the trigger event.

The StatusCodeToIgnoreList entry is a list of status codes that may be associated with the portable device history records. The status codes generally relate to contextual information about the delivery or pickup during which the associated geocode sample(s) were generated. If each of the package records associated with a current stop record has at least one of the listed status codes, then the stop is ignored (e.g., the geocode samples may be provided with a zero weight). In general, such status codes are generated by the delivery system and indicate something about the delivery or pickup that may make the geocode sample unreliable. For example, status codes that indicate that a delivery was unsuccessful, such as, for example, "No such street," "Missed," and "Need Apartment," may be included on this list.

The NearATimeSinceLastA is used to divide the non-"A" type geocode records into "near-A" and "V" type records. If the TimeSinceLastA value for a geocode record is less than or equal to the NearATimeSinceLastA value, then the geocode record is considered to be a "near-A" type of record. Dividing the geocode samples based on the "age" of the geocode readings associated with each geocode sample allows the geocode samples to be weighted based on the age of the readings (and the assumed accuracy of the readings). For example, "A" records generally receive more weight than "near-A" records, which generally receive more weight than "V" records.

The remaining configuration entries in Table 1 are assigning relative weight values to each of the geocode samples based on the trigger type and the age of the geocode readings. The DriverRelease entries apply the associated weight factors to geocode samples that were captured in response to the driver indicating that an item was left at the presumed delivery address (e.g., without a signature). The PScan entries apply the associated weight factors to geocode samples that were captured in response to the driver scanning the package or other item during a delivery (or pickup). The Signature entries apply the associated weight factors to geocode samples that were captured in response to someone at the presumed delivery address signing for the item. The Stop- Complete entries apply the associated weight factors to geocode samples that were captured in response to the driver indicating that a stop is complete. In general, the Signature trigger event is assumed to generate more accurate geocode samples than the other trigger events. As such, the geocode samples captured in response to a trigger event are generally weighted higher than geocode samples captured in response to other trigger events. These weights may be further based on the type of geocode record, as illustrated in Table 1.

It should be noted that, as used herein, weighting a sample or other record with a weight factor of zero is considered equivalent to the business logic module and/or the OR algorithm module "ignoring" the sample or record.

FIG. 14 provides a flow chart that illustrates the process of applying statistical algorithms to a group of geocode samples associated with a unique point address in order to generate a reference location data set for the unique point address, in accordance with an embodiment of the present invention. The process may be executed by the LDS 23 and, in particular, by the OR algorithm module 206 of the LDS 23.

At step 500, the OR algorithm module 206 receives weighted geocode samples for a particular unique point address for which the geocode samples have changed (e.g., been added or otherwise modified). For example, the OR algorithm module 206 may receive the weighted geocode samples from the geocode samples processed by the business logic module 204 and stored in the weighted geocode sample data repository 224. At step 505, the OR algorithm module 206 may determine whether there are enough quality geocode samples associated with the point address in order to compute reference location data for the point address. For example, in one embodiment, the OR algorithm module 206 may require more than a predefined number of geocode samples with weights greater than zero or some other predefined number before calculating reference location data. If the OR algorithm module 206 determines that there are not enough quality geocode samples, no new reference location data is computed for the address, as indicated by step 510, and the module returns to step 500 where weighted geocode samples are received for another address.

However, if the OR algorithm module 206 determines that there are enough quality geocode samples to compute reference location data for the address, then the OR algorithm module 206 proceeds to step 514. At step 514, the OR algorithm module 206 runs a Nearest Neighbor algorithm in order to eliminate outliers from the set of geocode samples associated with the point address. As will be described in greater detail below, in addition to removing outlying geocode samples from the set of geocode samples, the nearest neighbor algorithm may also involve generating a first mean location point by computing an average (weighted or simple) location (e.g., an average latitude and longitude) from the non-outlying geocode samples. The OR algorithm module 206 may then use the non-outlying geocode samples and the first mean location point as input for the algorithm used in step 525 to generate reference location data for the point address.

In one embodiment, the first mean location point calculated in step 514 may be used as the reference geocode for the point address. In other embodiments, however, the geocode samples undergo further processing, before a reference geocode and/or a zone of confidence is generated for the point address. For example, in the illustrated embodiment, at step 525 the OR algorithm runs a "Circle of Confidence" (COC) algorithm in order to generate the reference geocode and the radius of a COC located around the reference geocode for the point address.

Once new reference location data is generated by the OR algorithm for a point address, in some embodiments, the OR algorithm module 206 may then update the reference location data set repository 226 by adding a new data set or by modifying an existing data set associated with the point address. In the illustrated embodiment, however, in order to reduce the number of reference location data updates that are, in some embodiments, communicated to remote systems, the OR algorithm module 206 is configured to only update the reference location data set repository 226 when the new reference location data set for an address would represent a "significant" change over any current reference location data set stored in the repository 226 for the address. In this regard, the OR algorithm module 206 may determine a significant change by, for example, comparing the change in latitude, change in longitude, change in mean distance, and/or change in COC radius to predefined minimum changes required for a reference location data set to be updated in the repository 226, as illustrated by step 550. The OR algorithm module 206 may then repeat one or more of the illustrated steps for the next point address for which the geocode samples have changed.

FIG. 15 shows a flow diagram that illustrates the process executed by the OR algorithm module 206 when it runs the nearest neighbor algorithm in accordance with an embodiment of the present invention. As illustrated by step 515 the OR algorithm module receives geocode samples for a point address. As described earlier, in one embodiment these geocode samples are weighted relative to each other. At step 516, the OR algorithm module determines a number "k" for the point address. At step 517, the OR algorithm module selects a first geocode sample of the geocode samples received for the given point address. At step 518, the OR algorithm determines the k nearest geocode samples to the selected geocode sample. The k nearest geocode samples are then used to calculate a score for the selected geocode sample, the score indicative of the density of neighboring sample points.

The number k may vary for each point address and may be determined, in step 516, based on the number of geocode samples received for that point address. The greater the number of geocode samples received for the point address, the higher the number k may be for that point address. However, this number k may be limited to a predefined maximum number of nearest neighbors. This maximum number of nearest neighbors may be specified through a parameter referred to herein as "MaxNN." In such an embodiment, the k nearest neighbors are the geocode samples located nearest to the selected geocode sample, up to the maximum number of nearest neighbors. For example, where the initially calculated value of k is 12 for a given point address, and where the MaxNN value is 10, the final assigned k-number for the all geocode samples associated with that point address would be 10 and, at step 518, the OR algorithm module would determine the 10 nearest neighbors for each of the selected geocode samples associated with the selected point address. However, where the initially calculated value for k is only 8 for that point address, the final assigned k-number for all geocodes associated with that point address would be 8 , and, at step 518, the OR algorithm would determine the 8 nearest neighbors for each of the selected geocode samples associated with the selected point address. More specifically, in one embodiment, step 518 involves the OR algorithm module determining the distance that each geocode sample associated with the point address is from the selected geocode sample. The OR algorithm module may then determine which geocode samples are the k nearest neighbors from the selected geocode sample.

At step 519, the OR algorithm module computes the sum of the squares of the distances between the selected geocode sample and each of its k nearest neighbors. The OR algorithm module then computes the square root of this sum in order to generate the "NN score" for the selected geocode sample. A geocode sample's NN score is indicative of the density of other geocode sample points located around the selected geocode point. A relatively low NN score indicates a relatively high density of neighboring sample points, while a relatively high NN score indicates a relatively low density of neighboring sample points. Thus, if a geocode sample is an outlier, the geocode sample will tend to have a lower density, and hence a higher NN score, compared to other geocode samples that are not outliers.

Once the NN score for the selected geocode sample has been calculated, the OR algorithm may then determine if there are any other geocode samples associated with the point address for which an NN score has yet to be calculated, as illustrated by step 520 in the flow diagram. If there are additional geocode samples associated with the point address that need to have NN scores computed for them, the OR algorithm module selects, at step 521, another geocode sample associated with the point address and returns to step 518 to begin the process of computing the NN score for the selected geocode sample. This process continues until the OR algorithm module has computed NN scores for each geocode sample of the received geocode samples associated with a particular point address.

Once NN scores have been computed for all of the received geocode samples associated with a point address, the OR algorithm module then compares all of the received geocode samples and their respective NN scores in order to determine which geocode samples are likely to be outliers. In a preferred embodiment, the outlier geocode samples for a given point address are determined by comparing the NN scores of the geocode samples associated with the point address to the other geocode samples associated with the same point address. In this regard, as illustrated by step 522 of the flow diagram, the OR algorithm module may be configured to determine the NN score at a predefined percentile of the NN scores of the geocode samples associated with the point address. The OR algorithm may then, at step 523, compare the NN score of each geocode sample to the predefined percentile NN score and, if the NN score of a geocode sample is higher than the predefined percentile NN score, mark the geocode sample as an outlier. For example, in one embodiment, the OR algorithm module determines the median value of all of the NN scores associated with the received geocode samples for a particular point address. In one such embodiment, the geocode samples having an NN score exceeding the median NN score may be marked as outliers. In another such embodiment, only the geocode samples having an NN score exceeding the median NN score by a predefined factor are deemed to be outliers. This factor may be specified through a predefined "OutlierFactor" parameter. In one embodiment, the percentile at which the predefined percentile NN score is computed is specified by a predefined "Quartile" parameter. For example, if the Quartile parameter is set to a value of "1," the value of the NN score at the first quartile of the NN scores (i.e., the NN score value where 25% of the geocode samples have NN scores at or below the given value) is computed. If the Quartile parameter is set to a value of "2," then the median NN score value for the geocode samples is computed.

Once the OR algorithm module has determined which geocode samples associated with a point address are outliers, then the OR algorithm module may compute a mean location point for the point address using the geocode samples that are not considered outliers, as illustrated by step 524. The averaging algorithm used by the OR algorithm module to compute the mean location point may involve a simple averaging algorithm or a weighted averaging algorithm. For example, a weighted averaging algorithm may use the weights assigned to the geocode samples by the business logic module 204 to compute a weighted average. Where each geocode sample includes longitude and latitude data, the averaging may include averaging the longitude data to generate a mean longitude and averaging the latitude data to generate a mean latitude. Thus, in one exemplary embodiment, the mean location point includes a mean longitude and a mean latitude. Therefore, in general, the OR algorithm module executing the nearest neighbor algorithm receives a plurality of geocode samples for a particular point address and outputs a mean location point for the point address and an indication of which geocode samples associated with the point address are considered outliers.

In one embodiment of the present invention, the first mean location point generated from the nearest neighbor algorithm in step 514 of FIG. 14 is used as the reference geocode for the point address. In such an embodiment, a circle of confidence may be determined by using a predefined radius around the reference geocode. However, in a preferred embodiment, output of the nearest neighbor algorithm is further processed by the COC algorithm in order to generate the reference location data (e.g., a reference geocode and a circle of confidence) for the point address, as illustrated by step 525 of FIG. 14.

In this regard, FIG. 16 shows a flow diagram that illustrates the process executed by the OR algorithm module when it runs the COC algorithm in accordance with an embodiment of the present invention. The OR algorithm module uses the first mean location point generated by the nearest neighbor algorithm in step 514 of FIG. 14, along with the geocode samples that were deemed not to be outliers, as input for the COC algorithm, as illustrated by step 526 of FIG. 16.

As illustrated by step 527 of the flow diagram, the OR algorithm module then computes a "first mean distance" that represents the average distance that the geocode samples are located from the first mean location point. The mean distance may be calculated using a simple or a weighted average.

At step 528, the OR algorithm module may compare the mean distance to a predefined maximum allowable mean distance. The predefined maximum mean distance may be specified by a predefined "MaxMDWO" (maximum mean distance without outliers) parameter. If the mean distance is greater than the maximum allowable mean distance, then the OR algorithm module may consider the geocode samples to be too widespread for the generation of accurate or useful reference location data. In such a situation, no new reference location data is computed for the particular point address, as illustrated by step 529, and the OR algorithm returns to step 526 to begin the process of creating new reference location data for the next point address. However, if the calculated mean distance is less than or equal to the predefined maximum allowable mean distance, then the OR algorithm module 206 may proceed to step 530.

At step 530, the OR algorithm is configured to ignore geocode samples that are a greater distance from the first mean location point than the product of the calculated mean distance and a predefined "scrub" factor.

At step 531, the OR algorithm module uses the remaining geocode samples (e.g., the geocode samples that were not ignored in step 530) as input to a second execution of the nearest neighbor algorithm described in FIG. 15 in order to calculate a second mean location point.

At step 532 of the illustrated embodiment, the OR algorithm module 206 may use the second mean location point as the reference geocode. The OR algorithm module may further calculate the radius of a circle of confidence (COC) as a predefined base COC radius plus the product of the mean distance and a COC scale factor. The reference geocode may be considered to be the center of the COC.

As with the business logic rules, the statistical algorithms and various predefined parameters used during the generation of the reference location data will often have a large impact on the quality of the final reference location data. As such, the algorithms and the predefined parameters used in the processes described above are preferably easily modifiable and externally configurable. Table 2 shows an exemplary embodiment of a configuration table used to turn algorithms on and off and to set the various predefined factors used by some of the algorithms described above, in accordance with one embodiment of the present invention.

non-zero weighted samples in the repository 224. This parameter may be used in step 505 of FIG. 14, as described above.

The MaxNN, OutlierFactor, and Quartile entries are used to control aspects of the Nearest Neighbor algorithm. More specifically, the MaxNN value represents the maximum number of nearest neighbors that are considered for a geocode sample when generating the NN score for the geocode sample. This process is described above in reference to step 516 of FIG. 15. Use of the OutlierFactor and the Quartile parameters, in accordance with one embodiment of the present invention, are described above in reference to steps 522 and 523 of FIG. 15.

The MaxMDWO, MinCOCRadius, BaseCOCRadius, COCScaleFactor, and SampleDistToMeanScrubFactor entries are used by the OR algorithm during calculation of the reference geocode and a circle of confidence (COC) about the reference geocode. The MaxMDWO entry identifies a maxi-

TABLE 2

| Component | Section | Config Entry | Default value | Range |
|---|---|---|---|---|
| OR Algorithm | Process | ProcessAll | FALSE(0) | 0, 1 |
| | | DeleteLoadFiles | TRUE(1) | 0, 1 |
| | | Algorithm_Assembly | Algorithm1 | |
| | | MinGeoSamp | 2 | 0-32767 |
| | Nearest Neighbor Calculation | MaxNN | 10 | 0-32767 |
| | | OutlierFactor | 2.5 | double |
| | | Quartile | 2.0 | double |
| | Ref. Geocode and COC Calculation | MaxMDWO | 500 | double |
| | | MinCOCRadius | 250 | double |
| | | BaseCOCRadius | 150 | double |
| | | COCScaleFactor | 1.25 | double |
| | | SampleDistToMeanScrubFactor | 3.0 | double |
| | Reference Data Generation | ChangeThresholdLatLong | 0 | double |
| | | ChangeThresholdMeanDist | 0 | 0-32767 |
| | | ChangeThresholdRadius | 0 | 0-32767 |
| | Sample Cleanup | MaxGeoSampToKeep | 40 | 0-32767 |
| | | MinGeoSampAgeBeforeDelete | 30 | 0-32767 |
| | | AbsoluteMaxSamples | 1000 | 0-32767 |

The ProcessAll entry of Table 2 instructs the OR algorithm module 206 whether to process geocode samples for all of the unique point addresses that have geocode samples stored in the geocode sample data repository 224 or whether to process only the geocode samples for those point addresses that have new or modified data in the repository 224. The ProcessAll entry may either be true (i.e., process data for all addresses) or false (i.e., process data only for those addresses having new or modified data). The DeleteLoadFiles entry of Table 2 can be either true or false and instructs the system as to whether the temporary load files should be deleted.

The Algorithm_Assembly entry of Table 2 is the name of the .NET Assembly, such as a Dynamic Link Library (DLL), containing implementation of the logic algorithm. This entry allows adding a new OR algorithm by putting a new DLL name in the configuration entry and thereby installing a new DLL.

The MinGeoSamp entry of Table 2 indicates to the OR algorithm module 206 a minimum number of geocode samples needed to perform the computations used to generate the reference location data. This may be based on all geocode samples stored in the geocode sample data repository 224 or only on the samples in the repository that are weighted above some predefined weight value. For example, in one embodiment, the MinGeoSamp value is compared to the number of mum mean distance without outlier samples allowable for the reference location data to be generated. The MaxMDWO may be used, for example, as the predefined maximum mean distance described above in reference to step 528 of FIG. 16. If the mean distance of the geocode samples from the mean location point after eliminating outlying samples is greater than this maximum mean distance value, then the samples may be considered too widespread for an accurate reference location data set to be generated for the associated point address.

The MinCOCRadius entry identifies a minimum COC radius for the reference location data sets. This value acknowledges the imprecision caused by day to day variations in such variables as a driver's delivery or pickup methods and the quality of GPS, or other geocode, readings.

The BaseCOCRadius entry identifies a base radius used in the calculation of the COC radius, as described, for example, in reference to step 532 of FIG. 16. This value also acknowledges the imprecision in the repeatability of the GPS readings. Similarly, the COCScaleFactor is used in the calculation of the COC radius, for example, as described above in reference to step 532 of FIG. 16. This value acknowledges the imprecision in the OR algorithm itself. The SampleDistToMeanScrubFactor value is the "scrub" factor used, for example, as described above in reference to step 530 of FIG. 16.

As described above, in some embodiments, the OR algorithm module 206 may only update the reference location data set repository 226 when the new reference location data set for an address would represent a "significant" change over the current reference location data set stored in the repository 226 for the address. In this regard, the OR algorithm module 206 may determine a significant change by, for example, comparing the change in latitude, change in longitude, change in mean distance, and/or change in COC radius to predefined minimum changes required for a reference location data set to be updated in the repository 226. The ChangeThresholdLatLong value is the change in the latitude or longitude required before a change to a reference location data set is made in repository 226. The ChangeThresholdMeanDist value is the change in the computed mean distance required before a change to a reference location data set is made in repository 226. The ChangeThresholdRadius value is the change in the COC radius required before a change to a reference location data set is made in repository 226.

Although not shown in FIG. 14, the OR algorithm module 206 may also be configured to cleanup the geocode sample repository 224 by deleting geocode samples associated with a point address when the number of geocodes associated with the address is greater than a predefined maximum number. In this regard, the MaxGeoSampToKeep value is the maximum number of geocode samples that are allowed to be kept in the weighted geocode sample repository 224. In one embodiment, the samples having the lowest weights are the first to be deleted. If two samples have the same weight, then the oldest sample is deleted first. The MinGeoSampAgeBeforeDelete value is the minimum age (e.g., in days) of a geocode sample before these delete rules can apply to a geocode sample. Since some locations may have multiple delivery points (e.g., a strip mall), this value helps to retain multiple samples from each delivery point so that a COC can be generated that is large enough to cover all of the delivery points. The AbsoluteMaxSamples value overrides the MinLocSampAgeBeforeDelete value in order to prevent overloading problems caused by too many sample points for a single location. For example, some locations, such as a large building, may have a very large number of delivery points each day.

It should be emphasized that the above-described embodiments of the present invention, particularly any "preferred embodiments," are merely possible examples of the implementations, merely set forth for a clear understanding of the principles of the invention. Variations and modifications may be made to the above-described embodiments of the invention without departing substantially from the spirit of the principles of the invention. All such modifications and variations are intended to be included herein within the scope of the disclosure and present invention and protected by the following claims.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of generating reference location data for a plurality of unique point addresses, the method comprising:

receiving, via one or more processors, a plurality of geocode samples associated with a unique point address, wherein each geocode sample is captured during a delivery or a pickup of an item addressed to or from the unique point address;

computing, via the one or more processors, a reference geocode for the unique point address based on at least some of the plurality of geocode samples; and assigning, via the one or more processors, the reference geocode to the unique point address.

2. The method of claim 1, wherein the plurality of geocode samples and the reference geocode each comprise longitude and latitude data.

3. The method of claim 1, wherein the plurality of geocode samples comprises Global Positioning System (GPS) records.

4. The method of claim 1, further comprising:

computing a zone of confidence around the reference geocode.

5. The method of claim 4, wherein the zone of confidence comprises a circle of confidence with the reference geocode at the circle's center.

6. The method of claim 1, wherein the plurality of geocode samples comprise GPS records, each GPS record being recorded by a GPS sensor during the delivery or pickup.

7. The method of claim 1, wherein at least one of the plurality of geocode samples is captured in response to a predefined trigger event associated with the delivery or pickup process.

8. The method of claim 7, wherein the at least one of the plurality of geocode samples is captured by a portable device during the delivery or pickup, and wherein the predefined trigger event comprises at least one of an item scan event, an electronic signature capture event, an input to the portable device indicating that the item has been left at the current location, or an input or event that indicates to the device that the delivery or pickup of the item is now complete.

9. The method of claim 1, wherein each of the geocode samples are captured in response to one of a plurality of types of trigger events associated with the delivery or pickup process, and wherein computing the reference geocode based on the plurality of geocode samples comprises:

weighting the plurality of geocode samples based on the type of trigger event associated with each geocode sample.

10. The method of claim 1, wherein computing the reference geocode based on the plurality of geocode samples comprises:

ignoring geocode samples that are associated with an indication that the delivery or the pickup was unsuccessful.

11. The method of claim 1, wherein each geocode sample comprises latitude and longitude data, and wherein computing the reference geocode based on the plurality of geocode samples comprises:

calculating a reference latitude and a reference longitude using the latitude and longitude data of at least some of the plurality of geocode samples.

12. The method of claim 1, wherein the geocode samples are recorded by a geocode sensor of a portable computing device, wherein the geocode sensor senses geocode information from a geocode system, wherein the portable computing device captures a geocode sample by recording the sensed geocode information in response to at least one predefined trigger event occurring during the delivery or pickup, and wherein computing the reference geocode based on the plurality of geocode samples comprises:

weighting at least some of the geocode samples relative to each other based on an amount of time between when the geocode sensor sensed the geocode information and when the trigger event occurred.

13. The method of claim 1, wherein each of the geocode samples comprise latitude and longitude data, and wherein computing the reference geocode based on the plurality of geocode samples comprises:
weighting at least some of the plurality of geocode samples relative to each other based on one or more predefined rules; and
computing a mean latitude and a mean longitude by using the relative weights of the plurality of geocode samples to compute a weighted average of the latitude and longitude data associated with at least some of the plurality of geocode samples.

14. The method of claim 1, wherein computing the reference geocode based on the plurality of geocode samples comprises:
running a nearest neighbor algorithm to eliminate outlying geocode samples from the plurality of geocode samples.

15. The method of claim 1, wherein computing the reference geocode based on the plurality of geocode samples comprises:
ignoring outlying geocode samples from the plurality of geocode samples; and
averaging the remaining geocode samples of the plurality of geocode samples in order to generate a mean-location-without-outliers point for the unique point address.

16. The method of claim 15, wherein ignoring outlying geocode samples comprises:
generating, for each geocode sample, a measure of the density of other geocode samples located in an area around the geocode sample; and
determining outlying geocode samples from the plurality of geocode samples based on the measure of the density.

17. The method of claim 16, wherein generating, for each geocode sample, a measure of density comprises:
computing a sum of the squares of the distances between the geocode sample and each of at least some of the other geocode samples.

18. The method of claim 1, wherein computing the reference geocode based on the plurality of geocode samples comprises:
averaging the plurality of geocode samples in order to generate a mean location point;
computing a mean distance by averaging the distances that each geocode sample is from the mean location point;
ignoring geocode samples of the plurality of geocode samples that are a greater distance from the mean location point than a factor of the computed mean distance; and
averaging any non-ignored geocode samples in order to generate the reference geocode.

19. The method of claim 18, further comprising:
generating a circle of confidence, wherein generating a circle of confidence comprises:
using the reference geocode as the center of the circle of confidence; and
computing a radius of the circle of confidence by providing a predefined base radius and adding the base radius to the product of the mean distance and a predefined radius scale factor.

20. The method of claim 1, further comprising:
determining whether an item addressed to the unique point address is being delivered to an incorrect location by comparing a current geocode reading taken proximate a point of delivery to the reference geocode associated with the unique point address.

21. A system for generating reference location data for a plurality of unique point addresses, the system comprising:
a geocode sample receiving module configured to receive a plurality of geocode samples associated with a unique point address, each geocode sample having been captured during a delivery or a pickup of an item addressed to or from the unique point address; and
a reference location data generating system having one or more memory storage areas and one or more processors configured to:
compute a reference geocode for the unique point address based on the plurality of geocode samples;
assign the reference geocode to the unique point address.

22. The system of claim 21, wherein the plurality of geocode samples and the reference geocode each comprise longitude and latitude data.

23. The system of claim 21, wherein the plurality of geocode samples comprise GPS records, each GPS record having been recorded by a GPS sensor during the delivery or pickup.

24. The system of claim 21, wherein the reference location data generating system is further configured to compute a zone of confidence around the reference geocode.

25. The system of claim 21, wherein at least one of the plurality of geocode samples was captured in response to a predefined trigger event associated with the delivery or pickup process.

26. The system of claim 21, wherein each of the geocode samples were captured in response to one of a plurality of types of trigger events associated with a delivery or pickup process, and wherein the reference location data generating system is configured to compute the reference geocode by weighting the plurality of geocode samples based on the type of trigger event associated with each geocode sample.

27. The system of claim 21, wherein the reference location data generating system is further configured to compute the reference geocode by ignoring geocode samples that are associated with an indication that the delivery or the pickup was unsuccessful.

28. The system of claim 21, wherein each geocode sample comprises latitude and longitude data, and wherein the reference location data generating system comprises:
an algorithm module configured to compute the reference geocode by calculating a reference latitude and a reference longitude using the latitude and longitude data of at least some of the plurality of geocode samples.

29. The system of claim 21, wherein the geocode samples are recorded by a geocode sensor of a portable computing device, the geocode sensor sensing geocode information from a geocode system, wherein the portable computing device is configured to capture a geocode sample by recording the sensed geocode information in response to at least one predefined trigger event occurring during the delivery or pickup, and wherein the reference location data generating system comprises:
a business logic module configured to weight at least some of the geocode samples relative to each other based on an amount of time between when the geocode sensor sensed the geocode information and when the trigger event occurred.

30. The system of claim 21, wherein each of the geocode samples comprise latitude and longitude data, and wherein the reference location data generating system comprises:
a business logic module configured to weight at least some of the plurality of geocode samples relative to each other based on one or more predefined rules; and an algorithm module configured to compute a mean latitude and a mean longitude by using the relative weights of the plurality of geocode samples to compute a weighted average of the latitude and longitude data associated with at least some of the plurality of geocode samples.

31. The system of claim 21, wherein the reference location data generating system comprises:
an algorithm module configured to run a nearest neighbor algorithm to eliminate outlying geocode samples from the plurality of geocode samples.

32. The system of claim 21, wherein the reference location data generating system comprises:
an algorithm module configured to:
ignore outlying geocode samples from the plurality of geocode samples; and
average the remaining geocode samples of the plurality of geocode samples in order to generate a mean-location-without-outliers point for the unique point address.

33. The system of claim 32, wherein the algorithm module is further configured to:
generate, for each geocode sample, a measure of the density of other geocode samples located in an area around the geocode sample; and
determine outlying geocode samples from the plurality of geocode samples based on the measure of the density.

34. The system of claim 33, wherein the algorithm module is further configured to:
compute a sum of the squares of the distances between a geocode sample and each of at least some of the other geocode samples; and
use the sum to generate the measure of the density for the geocode sample.

35. The system of claim 21, wherein the reference location data generating system comprises:
an algorithm module configured to:
average the plurality of geocode samples in order to generate a mean location point;
compute a mean distance by averaging the distances that each geocode sample is from the mean location point;
ignore geocode samples of the plurality of geocode samples that are a greater distance from the mean location point than a factor of the computed mean distance; and
average any non-ignored geocode samples in order to generate the reference geocode.

36. The system of claim 35, wherein the reference location data generating system is further configured to generate a circle of confidence, and wherein the algorithm module is configured to:
use the reference geocode as the center of the circle of confidence; and
compute a radius of the circle of confidence by providing a predefined base radius and adding the base radius to the product of the mean distance and a predefined radius scale factor.

37. The system of claim 21, further comprising:
a communication module for providing reference location data to one or more remote systems.

38. The system of claim 21, wherein the reference location data generating system comprises:
a get data module configured to reformat geocode sample data received by the geocode sample receiving module;
a business logic module configured to apply predefined business logic rules to the geocode sample data in order to generate a weighted database of geocode samples, each geocode sample weighted based on the predefined business logic rules;
an algorithm module configured to apply statistical algorithms to the plurality of weighted geocode samples in order to generate the reference geocode; and
a communication module for providing reference data to one or more other systems.

39. A computer program product for generating reference location data for a plurality of unique point addresses, the computer program product comprising at least one computer-readable storage medium having computer-readable program code logic stored therein, the computer-readable program code logic comprising:
a first code logic configured for receiving a plurality of geocode samples associated with a unique point address, wherein each geocode sample is captured during a delivery or a pickup of an item addressed to or from the unique point address; and
a second code logic configured for:
computing a reference geocode for the unique point address based on the plurality of geocode samples; and
assigning the reference geocode to the unique point address.

40. The computer program product of claim 39, wherein the plurality of geocode samples and the reference geocode each comprise longitude and latitude data.

41. The computer program product of claim 39, wherein the plurality of geocode samples comprises Global Positioning System (GPS) records.

42. The computer program product of claim 39, further comprising:
a third code logic configured for computing a zone of confidence around the reference geocode.

43. The computer program product of claim 39, wherein each of the geocode samples are captured in response to one of a plurality of types of trigger events associated with the delivery or pickup process, and wherein the computer-readable program code logic further comprises:
a third code logic configured for weighting the plurality of geocode samples based on the type of trigger event associated with each geocode sample.

44. The computer program product of claim 39, further comprising:
a third code logic configured for ignoring geocode samples that are associated with an indication that the delivery or the pickup was unsuccessful.

45. The computer program product of claim 39, wherein each geocode sample comprises latitude and longitude data, and wherein the computer-readable program code logic further comprises:
a third code logic configured for calculating a reference latitude and a reference longitude using the latitude and longitude data of at least some of the plurality of geocode samples.

46. The computer program product of claim 39, wherein the geocode samples are recorded by a geocode sensor of a portable computing device, wherein the geocode sensor senses geocode information from a geocode system, wherein the portable computing device captures a geocode sample by recording the sensed geocode information in response to at least one predefined trigger event occurring during the delivery or pickup, and wherein the computer-readable program code logic further comprises:
a third code logic configured for weighting at least some of the geocode samples relative to each other based on an amount of time between when the geocode sensor sensed the geocode information and when the trigger event occurred.

47. The computer program product of claim 39, wherein each of the geocode samples comprise latitude and longitude data, and wherein the computer-readable program code logic further comprises:
   a third code logic configured for weighting at least some of the plurality of geocode samples relative to each other based on one or more predefined rules; and
   a fourth code logic configured for computing a mean latitude and a mean longitude by using the relative weights of the plurality of geocode samples to compute a weighted average of the latitude and longitude data associated with at least some of the plurality of geocode samples.

48. The computer program product of claim 39, further comprising:
   a third code logic configured for running a nearest neighbor algorithm to eliminate outlying geocode samples from the plurality of geocode samples.

49. The computer program product of claim 39, wherein the second code logic comprises:
   a third code logic configured for ignoring outlying geocode samples from the plurality of geocode samples; and
   a fourth code logic configured for averaging the remaining geocode samples of the plurality of geocode samples in order to generate a mean-location-without-outliers point for the unique point address.

50. The computer program product of claim 49, wherein the third code logic comprises:
   a fifth code logic configured for generating, for each geocode sample, a measure of the density of other geocode samples located in an area around the geocode sample; and
   a sixth code logic configured for determining outlying geocode samples from the plurality of geocode samples based on the measure of the density.

51. The computer program product of claim 50, wherein the fifth code logic comprises:
   a seventh code logic configured for computing a sum of the squares of the distances between the geocode sample and each of at least some of the other geocode samples.

52. The computer program product of claim 39, further comprising:
   a third code logic configured for averaging the plurality of geocode samples in order to generate a mean location point;
   a fourth code logic configured for computing a mean distance by averaging the distances that each geocode sample is from the mean location point;
   a fifth code logic configured for ignoring geocode samples of the plurality of geocode samples that are a greater distance from the mean location point than a factor of the computed mean distance; and
   a sixth code logic configured for averaging any non-ignored geocode samples in order to generate the reference geocode.

53. The computer program product of claim 52, further comprising:
   a seventh code logic configured for generating a circle of confidence, wherein the seventh code logic comprises:
      an eighth code logic configured for using the reference geocode as the center of the circle of confidence; and
      a ninth code logic configured for computing a radius of the circle of confidence by providing a predefined base radius and adding the base radius to the product of the mean distance and a predefined radius scale factor.

54. The computer program product of claim 39, further comprising:
   a third code logic configured for communicating reference location data to one or more remote systems.

* * * * *

UNITED STATES PATENT AND TRADEMARK OFFICE
CERTIFICATE OF CORRECTION

| | | |
|---|---|---|
| PATENT NO. | : 7,840,340 B2 | Page 1 of 1 |
| APPLICATION NO. | : 11/735030 | |
| DATED | : November 23, 2010 | |
| INVENTOR(S) | : Graham et al. | |

It is certified that error appears in the above-identified patent and that said Letters Patent is hereby corrected as shown below:

Column 40
Line 14, "address based on the plurality of geocode samples" should read --address based on the plurality of geocode samples; and--

Signed and Sealed this
Fifth Day of April, 2011

David J. Kappos
*Director of the United States Patent and Trademark Office*